Aug. 19, 1952 R. B. HEARN ET AL 2,607,843
REMOTE CONTROL AND SUPERVISORY SYSTEM
Filed Nov. 12, 1948 21 Sheets-Sheet 1

INVENTORS: R. B. HEARN
H. M. PRUDEN
BY
Patrick J. Roche
ATTORNEY

INVENTORS: R. B. HEARN
H. M. PRUDEN
BY Patrick J. Rocke
ATTORNEY

Aug. 19, 1952  R. B. HEARN ET AL  2,607,843
REMOTE CONTROL AND SUPERVISORY SYSTEM
Filed Nov. 12, 1948  21 Sheets-Sheet 14

INVENTORS: R.B.HEARN
H.M.PRUDEN
BY Patrick J. Roche
ATTORNEY

Aug. 19, 1952     R. B. HEARN ET AL     2,607,843

REMOTE CONTROL AND SUPERVISORY SYSTEM

Filed Nov. 12, 1948     21 Sheets—Sheet 16

FIG. 16

INVENTORS: R.B. HEARN
H.M. PRUDEN
BY Patrick J. Roche
ATTORNEY

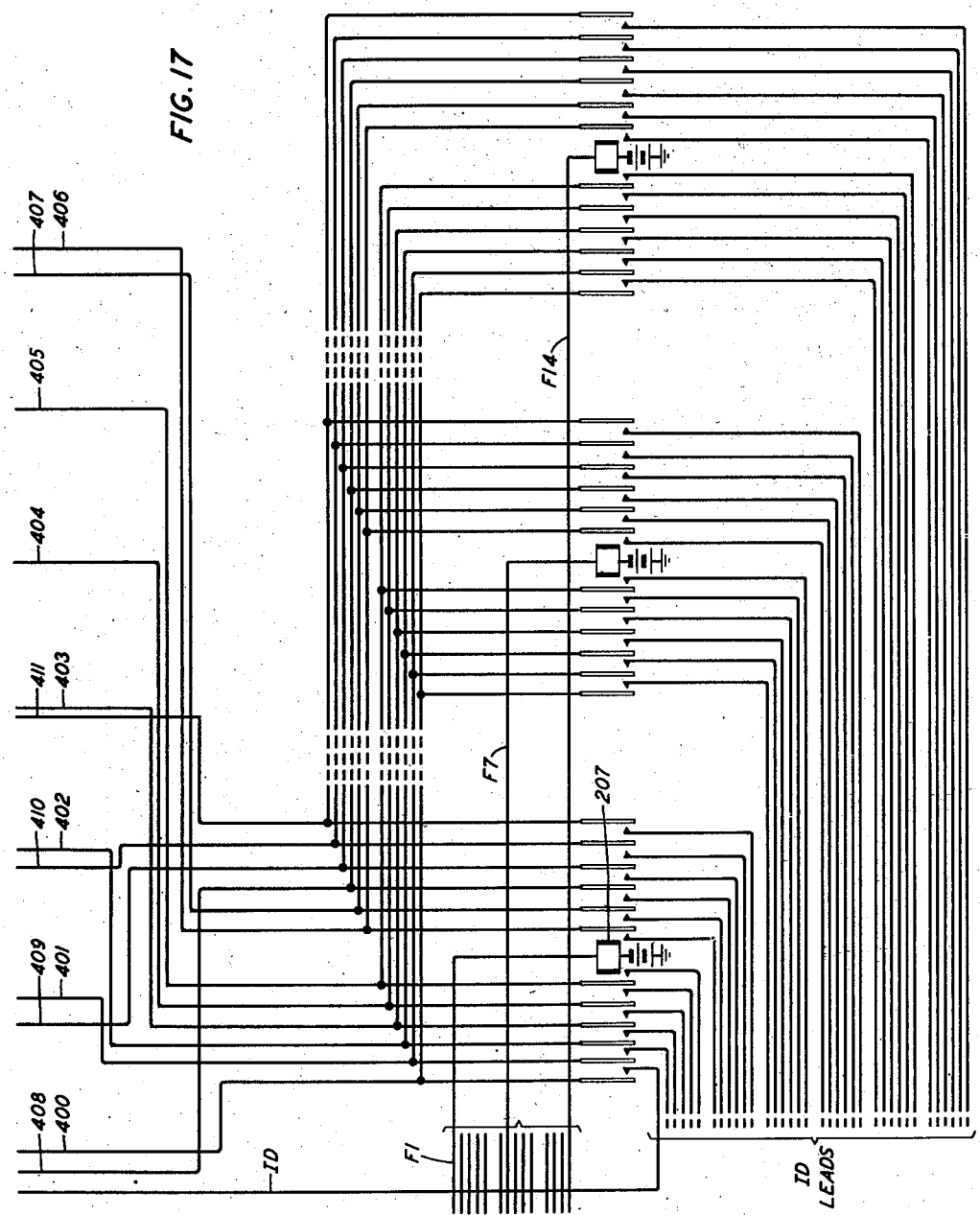

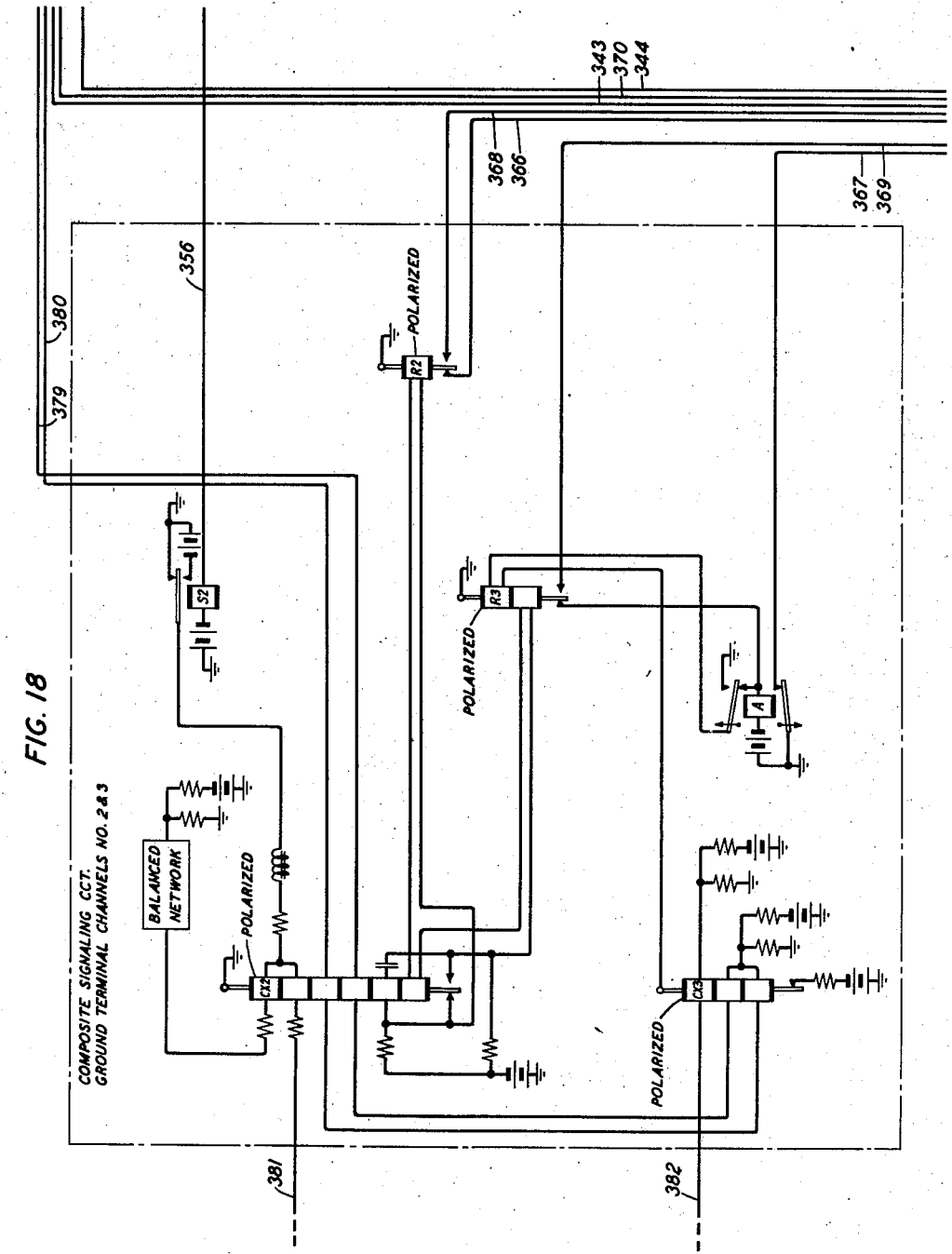

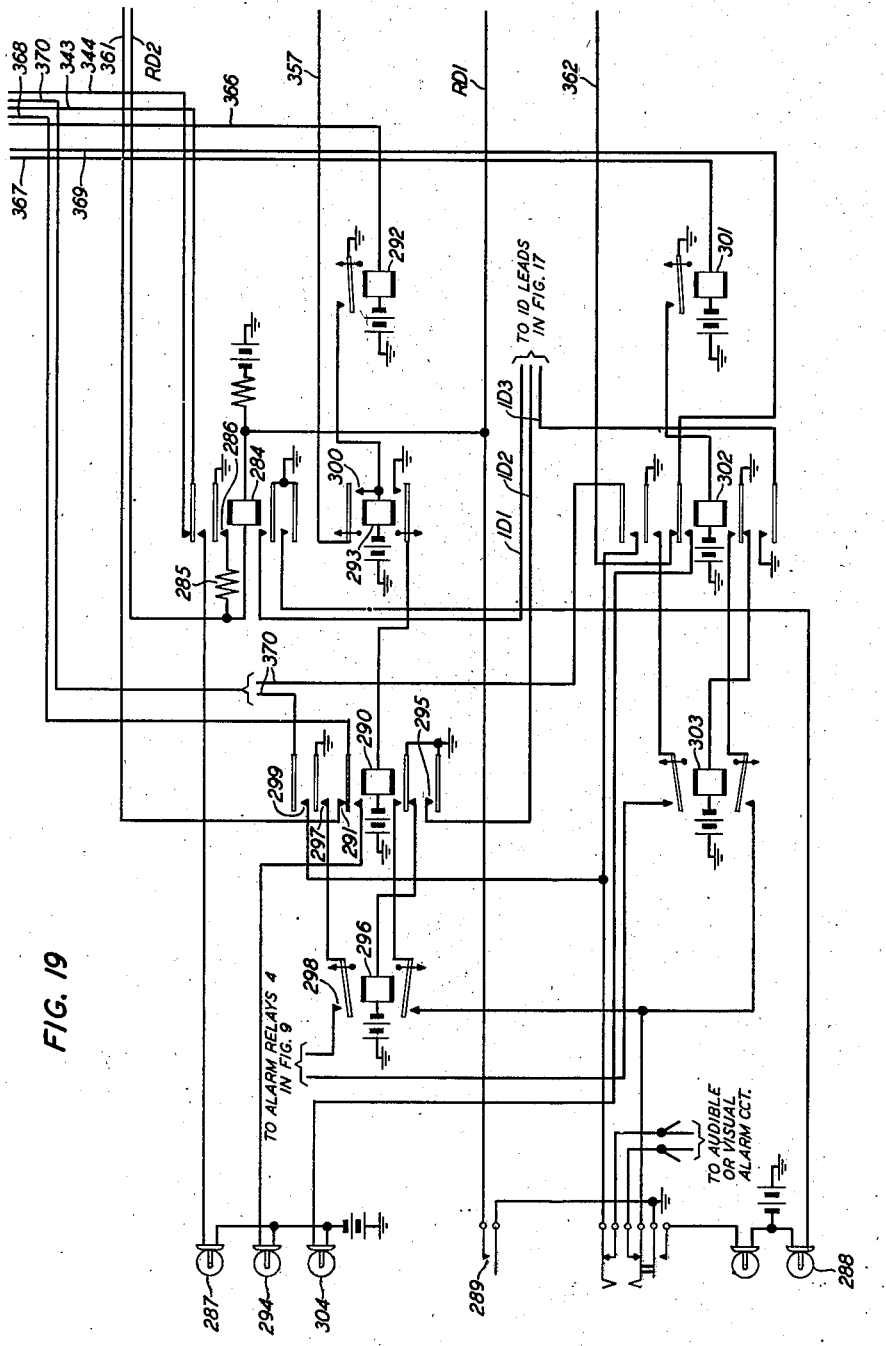

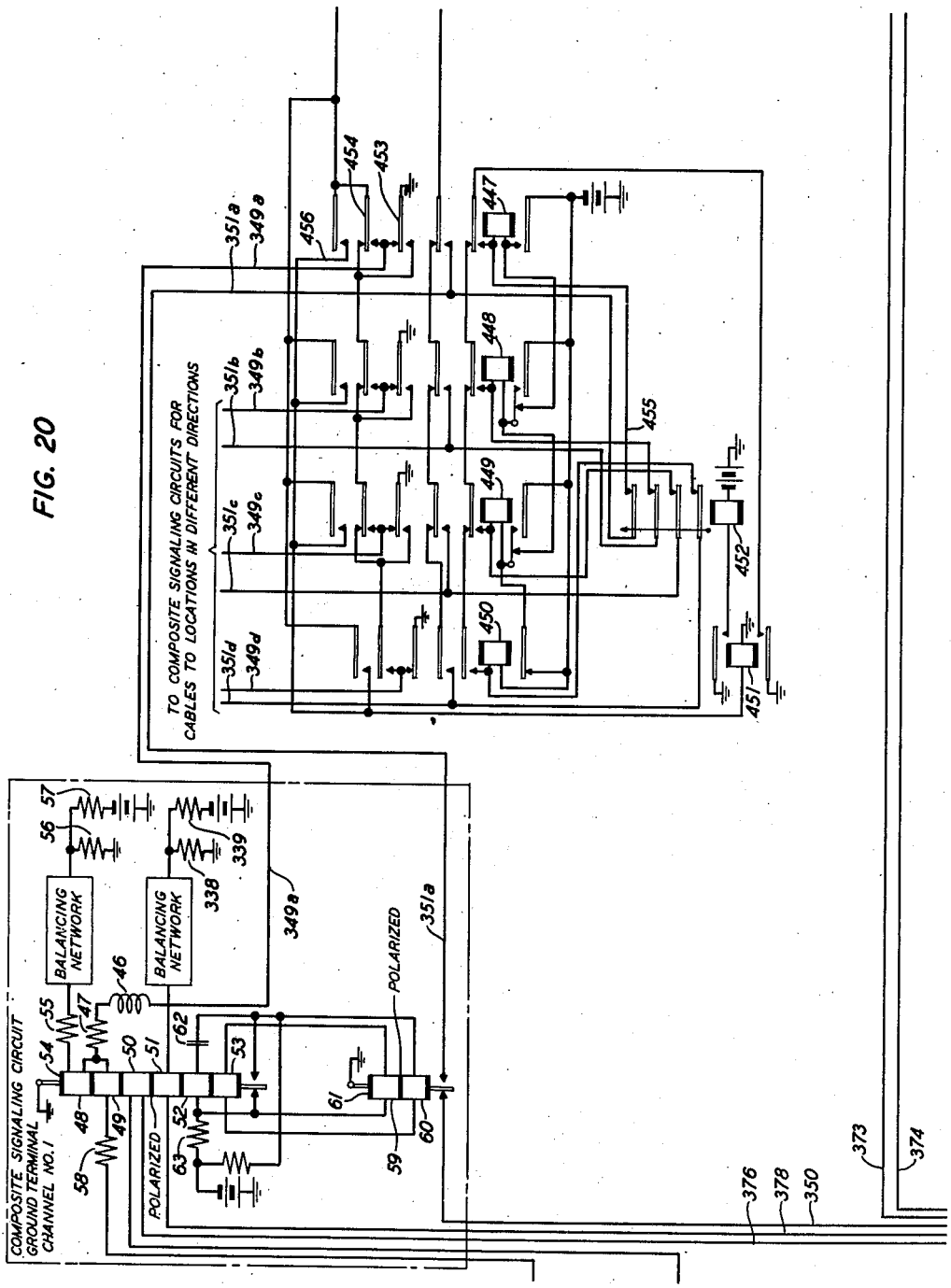

FIG. 22

Alarm Indicator Record

Serial No. _____

| DATE | | | ACTION TAKEN | |
|---|---|---|---|---|
| TIME RECEIVED | A/P | BY | | |
| SENDING OFFICE | | | TROUBLE FOUND | |
| RECEIVING OFFICE | | | DATE OK | TIME A/P BY |

| SYNCHRONIZATION - START | | | | | CA FAIL SEND CKT. | | | STATION IDENTIFICATION | | | |
|---|---|---|---|---|---|---|---|---|---|---|---|
| ON | ON | OFF | ON | ON | CHAN. 1 SECT. | CHAN. 2 FAIL | CHAN. 3 FAIL | 1 | 2 | 4 | 5 |
| SYNCHRONIZATION - STOP | | | | | FUEL GAS LOW | TEMP. HIGH LOW | FIRE | DOOR OPEN | LOC CUT THRU | COC CUT THRU | PA LOC. CLEAR |
| ON | ON | OFF | ON | ON | | | | | | | |

| FUSES | | 24-VOLTS | | ABS | | | | 130-VOLTS | | | |
|---|---|---|---|---|---|---|---|---|---|---|---|
| DISCH. | DIST. | H-L VOLT | REG. FAIL | 24V 130V | 48V | GEN. FUSE FAIL | GEN. FAIL | POS. FLOAT | POS. H-L LOAD | NEG. FLOAT | NEG. H-L LOAD |

| POWER CONTROL PANEL FAILURE | | | | | | | | COM'L A.C. PWR. | | GAS ENG. | |
|---|---|---|---|---|---|---|---|---|---|---|---|
| 201-202W | 203-204W | 205-206W | 207-208W | 201-202E | 203-204E | 205-206E | 207-208E | FAIL | RESTORE | FAIL | OPER. |

| ALT. CONT. BAY - NO VOLT. OUT. | | | | NO VOLT. - TRANS. TO MOT. ALT. | | | | MOTOR ALTERNATOR FAIL | | | |
|---|---|---|---|---|---|---|---|---|---|---|---|
| 201 202 | 203 204 | 205 206 | 207 208 | 201 202 | 203 204 | 205 206 | 207 208 | NO. 1 | NO. 2 | NO. 3 | NO. 4 |

| RECT. FAIL 24/130V | 48V H-L VOLT | | RECTIFIER-INVERTER FAILURE | | | | RECT. INVERT. OPER. | MOT. ALT. A.C. MOT. FAIL | MOT. ALT. EMG. FAIL | POWER TRS. TO MOT. ALT. | ALT. CONT. FUSE ALARM |
|---|---|---|---|---|---|---|---|---|---|---|---|
| | | | NO. 1 | NO. 2 | NO. 3 | NO. 4 | | | | | |

| 64 KC PILOT ALARM AT NON-SW. MAIN | | | | | | | | 3096 (WKG. LINE) PILOT AT SW. MAIN | | | |
|---|---|---|---|---|---|---|---|---|---|---|---|
| 201 | 202 | 203 | 204 | 205 | 206 | 207 | 208 | 201 203 | 205 207 | 202 204 | 206 208 |

| 2064 KC PILOT ALARM AT NON-SW. MAIN | | | | | | | | 3096 (SP. LINE) PILOT AT SW. MAIN | | | |
|---|---|---|---|---|---|---|---|---|---|---|---|
| 201 | 202 | 203 | 204 | 205 | 206 | 207 | 208 | 201 203 | 205 207 | 202 204 | 206 208 |

| 3096 KC PILOT ALARM AT NON-SW. MAIN | | | | | | | | SP. LINE FAIL AT SW. MAIN | | | |
|---|---|---|---|---|---|---|---|---|---|---|---|
| 201 | 202 | 203 | 204 | 205 | 206 | 207 | 208 | 201 203 | 205 207 | 202 204 | 206 208 |

| TOT. LINE FAIL AT SW. MAIN | | | | AUTO. SWITCH AT SW. MAIN | | | | AUTO. SW. LOCKED AT SW. MAIN | | | |
|---|---|---|---|---|---|---|---|---|---|---|---|
| 201 203 | 205 207 | 202 204 | 206 208 | 201 203 | 205 207 | 202 204 | 206 208 | 201 203 | 205 207 | 202 204 | 206 208 |

| WORKING LINE AT SWITCHING MAIN | | | | | | | | | | | |
|---|---|---|---|---|---|---|---|---|---|---|---|
| 201 | 202 | 203 | 204 | 205 | 206 | 207 | 208 | | | | |

| PILOT ALARM AT AUX. STATION | | | | | | | | | | | |
|---|---|---|---|---|---|---|---|---|---|---|---|
| 201-202W | 203-204W | 205-206W | 207-208W | 201-202E | 203-204E | 205-206E | 207-208E | | | | |

| CARRIER SUPPLY | | | | | | | | | | | |
|---|---|---|---|---|---|---|---|---|---|---|---|
| SG FAIL | GROUP FAIL | GEN. TRANS. | 4KC END ALM. | | | | | | | | |

INVENTORS R.B. HEARN
H.M. PRUDEN

BY Patrick J. Roche
ATTORNEY

Patented Aug. 19, 1952

2,607,843

UNITED STATES PATENT OFFICE 2,607,843

REMOTE CONTROL AND SUPERVISORY SYSTEM

Richard B. Hearn, Hollis, N. Y., and Harold M. Pruden, Maplewood, N. J., assignors to Bell Telephone Laboratories, Incorporated, New York, N. Y., a corporation of New York Application November 12, 1948, Serial No. 59,704

20 Claims. (Cl. 177—353)

1

This invention relates to an alarm and control circuit for an intelligence transmission system, and more specifically to an alarm and control circuit for enabling the supervision of a plurality of unattended repeater stations by an attended repeater station embodied in such system.

The automatic operation of an alarm and control circuit involving several unattended repeater stations and an attended repeater station in coaxial signaling transmission systems has been long known. However, in those alarm and control circuits, the operating conditions at the unattended stations were assumed to be normal, in the absence of a fault signal received at the attended station. If for any reason a fault signal failed to be recorded in the attended station to indicate the occurrence of the fault and/or an undesired change in operation conditions at the attended stations several hours may have elapsed before the fault or changed operating condition was made known to the operating personnel at the attended station. This may occasion an avoidable interruption of transmission service. In coaxial intelligence transmission systems arranged for transcontinental operation, it is desirable to reduce interruptions of service to a matter of seconds, and/or to eliminate them entirely.

The present invention contemplates, accordingly, supervisory techniques that tend to anticipate the occurrence of certain faults in coaxial transmission systems whereby a material reduction of fault occurrences as well as the time duration thereof may be effected.

The present invention therefore concerns an alarm and control circuit of the remote supervisory type for use in coaxial signaling transmission systems whereby the operating personnel at an attended repeater station may check the operating conditions at each unattended repeater station whenever desired; may cause the performance of preselected operations of remotely controllable mechanisms at each unattended repeater station; and thereafter may check such performances to ensure that the controlled mechanisms are operating as intended.

The main object of the invention is to provide an alarm and control circuit for supervising a plurality of unattended stations from an attended station in a coaxial intelligence transmission system.

Another object is to check the operating conditions at each unattended station at will.

A further object is to reduce the frequency of occurrence of faults.

2

Another object is to reduce the time duration of individual faults.

Another object is to request information from preselected unattended stations, and to record at the attended station the responses to such requests.

Another object is to transmit operational order signals to preselected unattended stations, and to check the manner in which such orders have been carried out thereat.

Another object is to provide a cable failure alarm for reporting to the attended station the occurrence of faults on the transmission line.

Another object is to condition for transmission only one group of several groups of unattended stations at a given time.

Another object is to preclude interference in the signaling transmission between a designated unattended station and the attended station by the other unattended stations in the same group.

Another object is to provide permanent records of certain operating conditions at each unattended station on a predetermined time basis.

In a specific embodiment, the invention comprises an attended repeater station connectable to one or more unattended repeater stations arranged in predetermined groups extending in preselected geographical directions relative to the attended station. Each unattended station includes a station alarm sending circuit connected to various alarm circuits therein for automatically transmitting to the attended station a signal indicating when a major and/or a minor fault occurs thereat; and an indication sending circuit for scanning predetermined indication points in response to a certain order from the attended station and sending to the latter station signals corresponding to the conditions of the indication points. In this connection there is contemplated the sending of indication signals representing a possible 168 indication points at each unattended station, the first five and the last five signals constituting synchronizing signals. The term "indication" as used therein refers to the status of various operational conditions at each unattended station, such for example, as the functioning or non-functioning of transmission lines, the condition of the order wire circuit, whether the order signals sent from the attended station to particular unattended stations have been fulfilled thereat, etc. An illustration of the latter would be whether a gas engine actually started after an order to start it at a preselected unattended station had been sent thereto. This may be accomplished by causing each unattended station to send signals corresponding to the possible 168 indication points thereat.

The attended station comprises a bank of 168 neon lamps connectable to the 168 indication points at each unattended station. Of these lamps, the first five and the last five are controlled by the ten synchronizing signals to indicate synchronization between the remaining 158 indication points and the corresponding lamps. The attended station also includes circuits for sending code orders to the unattended stations to select a certain one of the latter stations and to perform thereat specific operations such, for example, as those mentioned above concerning the possible indications associated with each unattended station. The sending of operational orders is achieved by dialing at the attended station the code of individual unattended stations, followed immediately thereafter by a code corresponding to the operation to be performed thereat. The 168 indication lamps are arranged under a translucent plate in such manner that a data sheet of letter size may be placed over it and the illuminated lamp positions manually noted or recorded on the sheet. This will provide a permanent record of the condition of the indication points at each unattended station at the time the record was taken.

The attended station further includes a lamp mechanism for receiving the major and/or minor alarm signals sent out from the individual unattended stations, and for identifying the unattended station originating the alarm signal as well as whether the alarm was a major or minor type; and thereafter for sending out an order signal for causing the particular unattended station initially originating the alarm signal to repeat it. This will afford a determination whether the initial alarm signal was due to a transitory or permanent fault. In this connection, a transitory fault will not cause the repetition of the initial alarm signal whereas a permanent fault will effect immediately a repetition of the initial alarm signal.

Three composite signaling channels and a neutralizing channel provide the necessary circuits for transmitting signal pulses and steady-state current between the attended and unattended stations. Two types of composite signaling circuits are utilized, one being a ground terminal and the other a battery terminal. Each section of transmission line extending between adjacent stations employs a battery terminal and a ground terminal, the battery terminal being connected to the end of the line section farthest from the attended station and the ground terminal on the end of the line section nearest to the attended station. A fourth signaling channel serves to neutralize interference in the electromagnetic relays utilized in the three composite signaling channels by aiding in the suppression of longitudinal currents and in the prevention of crossfire between the three composite signaling channels.

Channel 1 transmits a signal to the attended station when the channel is seized by an unattended station in response to the occurrence of a fault thereat. If the attended station is free to receive alarm signals, it responds to the seizure signal by sending a signal over channel 1 to the faulty unattended station to proceed with the sending of the major and/or minor alarm signals to the attended station. Channel 1 is therefore adapted for two-way transmission. Channel 2 transmits order signals from the attended station to the unattended stations and synchronizing signals from the unattended stations to the attended station. Channel 2 is therefore adapted for two-way transmission. Channel 3 transmits indication signals in the direction from the unattended stations toward the attended station, and is therefore adapted for one-way transmission only.

Vibrating circuits associated with the three composite signaling channels serve to reform the signals thereby compensating for signal distortion by shortening long pulses and lengthening short pulses and in addition serve to repeat the signals in both directions. When one or more unattended stations intervene between the attended station and the particular unattended station originating the alarm signals, all intervening unattended stations repeat the alarm signals. The three composite signaling channels and the neutralizing channel together with the attended and unattended stations connected thereto include circuit provisions for sequence and lock-out operation to preclude interference between an unattended station originating alarm and/or indication signals and the remaining unattended stations in the same group when the former unattended station is engaged in transmitting such signals. The attended station also includes circuit provisions for directional lockout operation to preclude interference between two or more groups of unattended stations connected to the attended station. The signaling channels include a cable failure alarm whereby the over-all transmission system may be sectionalized for locating points of cable failure.

A feature concerns automatic operation whereby a fault originating in any unattended station is immediately reported in the attended station. This involves seizure of channel 1 by the fault unattended station and the sending of a signal by the latter station to the attended station; and, subsequently, a return signal sent out on channel 1 by the attended station that the system is conditioned for the transmission of the alarm signals by the fault unattended station. Another feature involves the identification in the attended station of the unattended station originating the alarm together with an indication of the type of alarm, i. e., whether the fault is a major or minor one. Another feature relates to a lock-out circuit in each unattended station whereby when one unattended station is engaged in the process of transmitting alarm signals to the attended station, the transmission of alarm signals from all other unattended stations is held up. A further feature relates to the directional lock-out circuit in the attended station whereby alarm signals from unattended stations extending in all but one geographical direction are held up while alarm signals from unattended stations extending in the one geographical direction are transmitted to the attended station. The alarm signals so held up will not be transmitted until the signaling channels of the respective groups of unattended stations are conditioned for signal transmission.

Another feature relates to a circuit in each unattended station for recognizing the termination of the pulses required for identifying both the particular unattended station originating the alarm pulses and the type of alarm, i. e., whether a major or minor one. Another feature involves a recheck circuit whereby an operator at the attended station may cause each unattended station sending in an alarm to repeat the alarm signal. This will provide an indication for the operator whether original alarm signal was due to a transitory fault or a permanent fault; if due to a transitory fault, the fault or alarm indicator will not be reactuated in the attended station; and if due to a permanent fault, the fault or alarm indicator will be reactuated at the attended station.

Another feature relates to the use of balanced circuits whose differential current serves to control the operation of electromagnetic relays embodied therein. This enables two-way signal transmission on one line conductor. Another feature involves a storage of the major and minor alarms at the attended station so that the alarms will not be lost until cleared and so that new alarms may be received from the same or a different unattended station.

Another feature concerns an arrangement for scanning a possible 168 indication points at each of the unattended stations and indicating the conditions of such indication points at the attended station. This arrangement also serves to isolate unattended stations more remote geographically from the attended station than the unattended station whose above-mentioned 168 indication points are in the process of being scanned; and to hold up the transmission of signals originating in all unattended stations other than the unattended station whose 168 indication points are being scanned. A further feature relates to synchronizing mechanism whereby each indication point scanned at each unattended station will be indicated by the proper lamp at the attended station. A feature involves a lock-out circuit for preventing the transmission on channel 2 of signals tending to outgo from the sending director circuit at the attended station during intervals when the indication sending circuit at one of the unattended stations is engaged in sending out on channel 3 indication signals corresponding to the conditions of the indication points at such unattended station. A feature includes a cable alarm circuit for indicating the occurrence of a fault on each of the signaling channels and for isolating the channel section on which such fault has occurred but permitting signaling transmission from unattended stations closer to the attended station. Another feature concerns a neutralizing circuit common to the three composite signaling channels for enabling the normal operation of these channels regardless of the existence of relatively large amounts of alternating current and/or direct current ground potential.

The invention will be readily understood from the following description taken together with the accompanying drawing in which:

Figs. 14, 15, 16 and 17 are schematic circuit diagrams of the unattended repeater stations of Figs. 1 and 2 showing an indication sending circuit in accordance with a specific embodiment of the invention;

Fig. 18 is a schematic circuit diagram of the unattended repeater stations of Figs. 1 and 2 showing a further portion of the composite signaling circuit ground terminal of Fig. 9;

Fig. 19 is a schematic circuit diagram of the unattended repeater stations of Figs. 1 and 2 showing a cable alarm sending circuit in accordance with a specific embodiment of the invention;

Fig. 20 is a schematic circuit diagram of the attended repeater station of Figs. 1 and 2 showing the remaining portion of the composite signaling circuit ground terminal included in Fig. 4 and the directional lock-out circuit associated with the alarm receiving circuit in accordance with the specific embodiment of the invention;

Fig. 21 shows the arrangement of the circuits of Figs. 3 through 20 for the most expeditious understanding of the specific embodiment of the invention; and Fig. 22 shows a data sheet for indicating operating conditions at the unattended repeater stations for the purpose of a permanent record.

Figure 1:
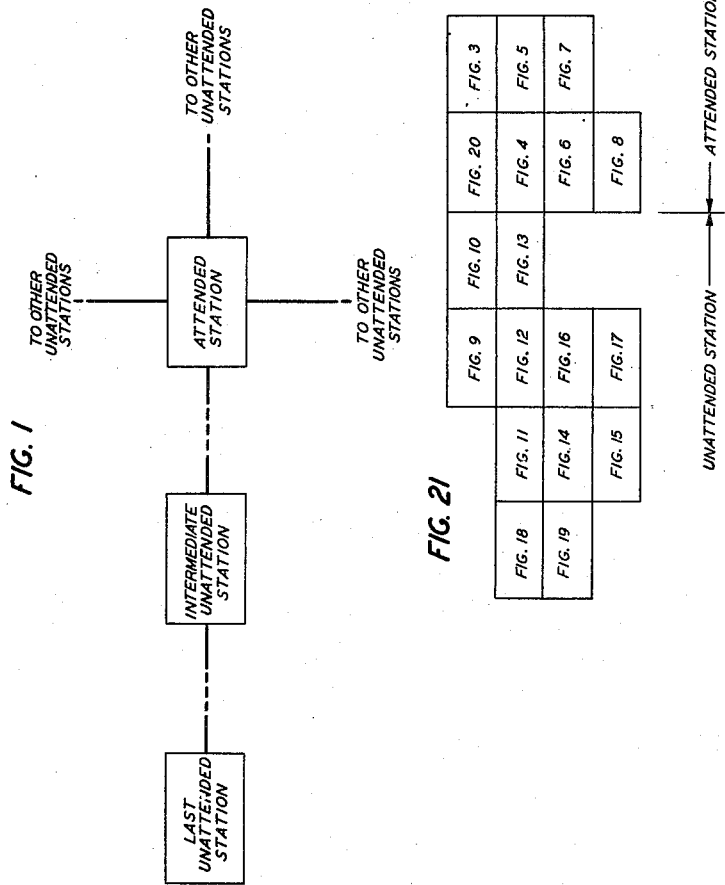
Fig. 1 is a box diagram showing a plurality of unattended repeater stations connected to an attended repeater station from each of four different geographical directions, all of which repeater stations are adapted to include an alarm and control system in accordance with a specific embodiment of the invention.
Figure 2:
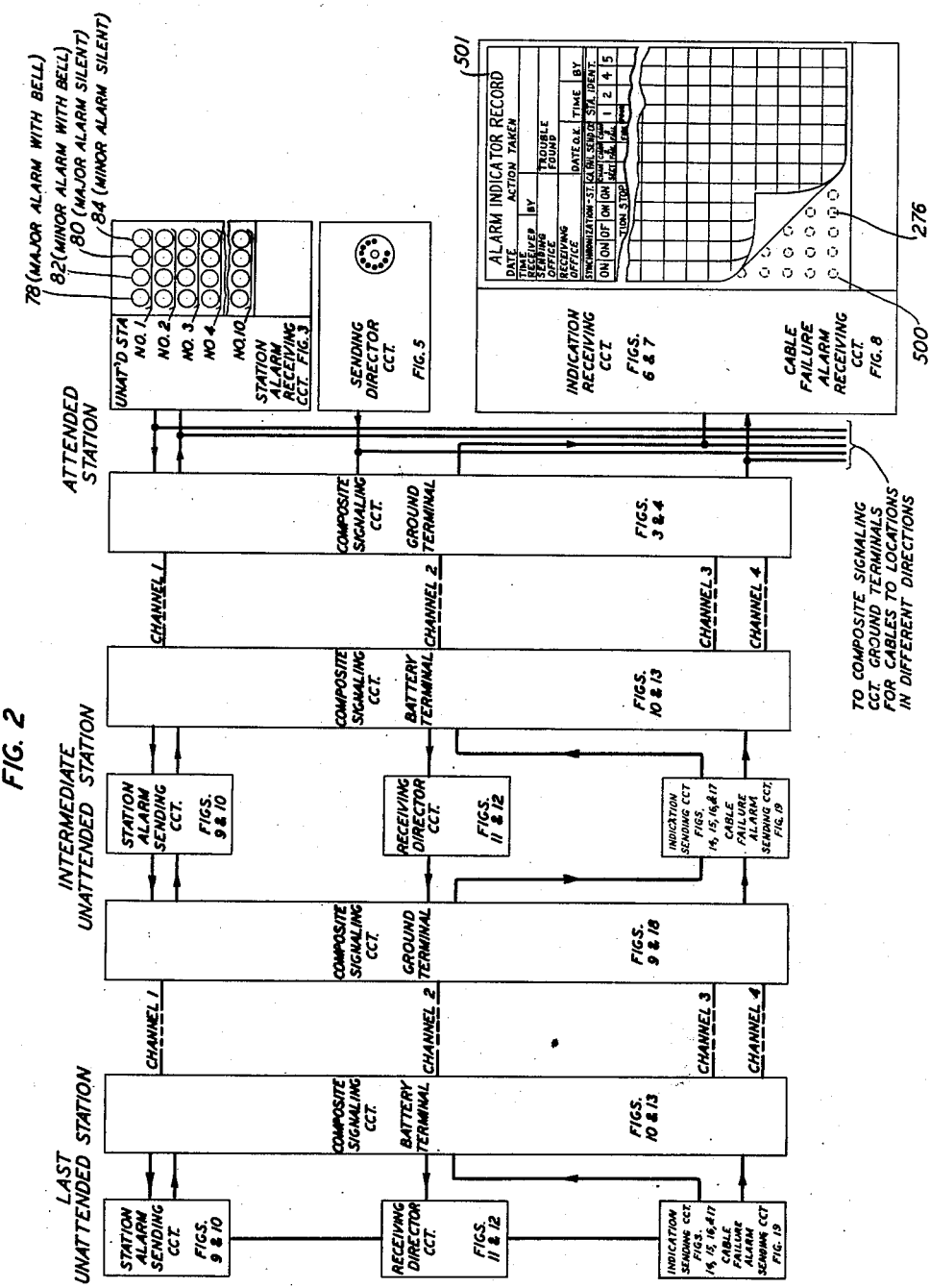
Fig. 2 is a box diagram showing the box diagram of Fig. 1 with additional circuit details.

The complete alarm and control system shown in Figs. 1 and 2 in accordance with a specific embodiment of the invention consists of one attended repeater station and one or more groups of unattended repeater stations extending in the same or different geographical directions. These repeater stations are of a type utilized for the transmission of intelligence. Each unattended station is connected to the attended station by four conductors, either directly or through other unattended stations in the same group and separate from the coaxial signalling transmission system per se. Thus the same four conductors serve to provide control circuits for all stations in the same group. Each four-conductor link between adjacent stations with same group is equipped with a composite signaling circuit at each end. These composite signaling circuits enable the four conductors between stations to provide two signaling paths from the attended station to all unattended stations in the same group and three signaling paths from each unattended station in the same group to the attended station as well as a path for neutralizing the effect of extraneous currents on signaling transmission on the aforementioned paths.

Major and minor alarms originating at the unattended stations are transmitted to the attended station by means of a station alarm sending circuit at each unattended station and a station alarm receiving circuit at the attended station. When an alarm originates at an unattended station in response to the occurrence of a fault thereat, this unattended station seizes control of signaling channel 1 extending to the attended station and sends a ground signal over this channel to the latter station and waits for the attended station to reply automatically by sending a battery signal back over the same channel to the fault unattended station, and thereafter the fault unattended station transmits a series of fault signal pulses to the attended station. The number of fault signal pulses transmitted indicates the identity of the unattended station and the major or minor character of the alarm. The station alarm receiving circuit at the attended station counts the fault signal pulses, operates an audible alarm and energizes a lamp to indicate the identity of the station originating the alarm and the major or minor character of the alarm. This alarm indication may be wiped out at the attended station whereby the fault unattended station is caused to repeat the alarm signal for the purpose of ascertaining whether the fault still exists.

Certain preselected operational order signals as previously identified may be transmitted from the attended station to individual unattended stations by means of a sending director circuit at the attended station for initiating the order signals and a receiving director circuit at individual unattended stations for responding to the order signals. The sending director circuit contains a telephone type dial that is operable in the usual manner to send order signals. Each order signal is transmitted by dialing three digits. The pulses representing these digits are transmitted by the composite signaling circuits over channel 2 to the receiving director circuits in the unattended repeater stations. The first digit indicates the designated unattended station to which the order signal was directed. All unattended stations in all groups count the pulses of this digit. The designated unattended station recognizes this digit and prepares to count the pulses in the next two digits while all other unattended stations stop counting and ignore the remaining digits of the order signal originated by the sending director circuit. The receiving director circuit in the designated unattended station counts the pulses of the second and third digits and upon the completion of the reception of the order signal causes the preselected operational order represented by these digits to be carried out. The sending director circuit at the attended station contains relays which count the pulses of the first digit of each sending director order signal so as to restore the energization of the major and/or minor alarm indicating lamps associated with the designated station each time the sending director circuit is operated for the transmission of order signals.

Other preselected operational orders such, for example, as an order to send information regarding certain conditions may be initiated by the sending director circuit at the attended station on channel 2 and responded to by an indication sending circuit at each unattended station and an indication receiving circuit at the attended station for the purpose of obtaining information concerning the certain conditions at each unattended station. This information is transmitted from one unattended station at a time to the attended station over signaling channels 2 and 3. In response to such operational order signal, the indication sending circuit at the designated unattended station goes through a predetermined cycle of operations that causes all existing information on the certain conditions thereat to be transmitted to the attended station. Information on each of the certain conditions is indicated by an open or closed condition of a pair of contacts associated with each such condition at the unattended station. The system described and illustrated herein, will transmit indication signals concerning 168 pairs of contacts at each unattended station. The indication receiving circuit at the attended station contains 168 lamps, one lamp corresponding to each pair of the 168 pairs of contacts at each unattended station. During the operation of the predetermined cycle of the indication sending and receiving system involving one unattended station and the attended station, the indication sending circuit at the designated unattended station generates a series of synchronizing pulses and transmits these pulses over channel 2 to the attended station. These synchronizing pulses serve to activate a scanning circuit at the attended station whereby the sending and receiving ends of channel 3 in turn are connected successively to one pair of the 168 pairs of contacts at the unattended station and the corresponding lamp in the attended station. Each time the indication sending circuit at the designated unattended station encounters a closed pair of contacts, an indication signal pulse is transmitted over channel 3 to energize the corresponding lamp in the attended station. Each such indicator signal pulse is accompanied by a particular synchronizing pulse on channel 2 to insure that the indicator signal pulse is associated with the proper lamp. These 168 lamps at the attended station corresponding to the 168 pairs of contacts at each unattended station are placed under a translucent plate on a writing shelf or the like so that a permanent record of conditions in the unattended station may be obtained by manually placing an appropriately marked sheet of paper on top of the translucent plate lamp bank and suitably manually marking such paper on each spot under which a lighted lamp is shown. Interlock circuits are provided at all unattended stations to limit the aforesaid signaling operations to one unattended station and the attended station at a given time.

Cable failure alarm signals are provided by cable failure alarm sending circuits in all unattended stations and a cable failure alarm receiving circuit in the attended station. These circuits operate to produce alarm signals at the attended station in case of failure of signaling channels 1, 2 or 3 and provide means for isolating the defective section of the cable whereby the portion of the control system lying between the fault section and the attended station is permitted to operate on a normal basis.

The detailed operation of the alarm and control system shown in Fig. 2 will be explained hereinafter with reference to the description and operation of the components located in one unattended station and in the attended station shown in Fig. 1. With reference to Fig. 1 it will be obvious that the unattended stations may be connected to the attended station from at least four geographical directions.

Station alarm sending circuit

Figure 3:
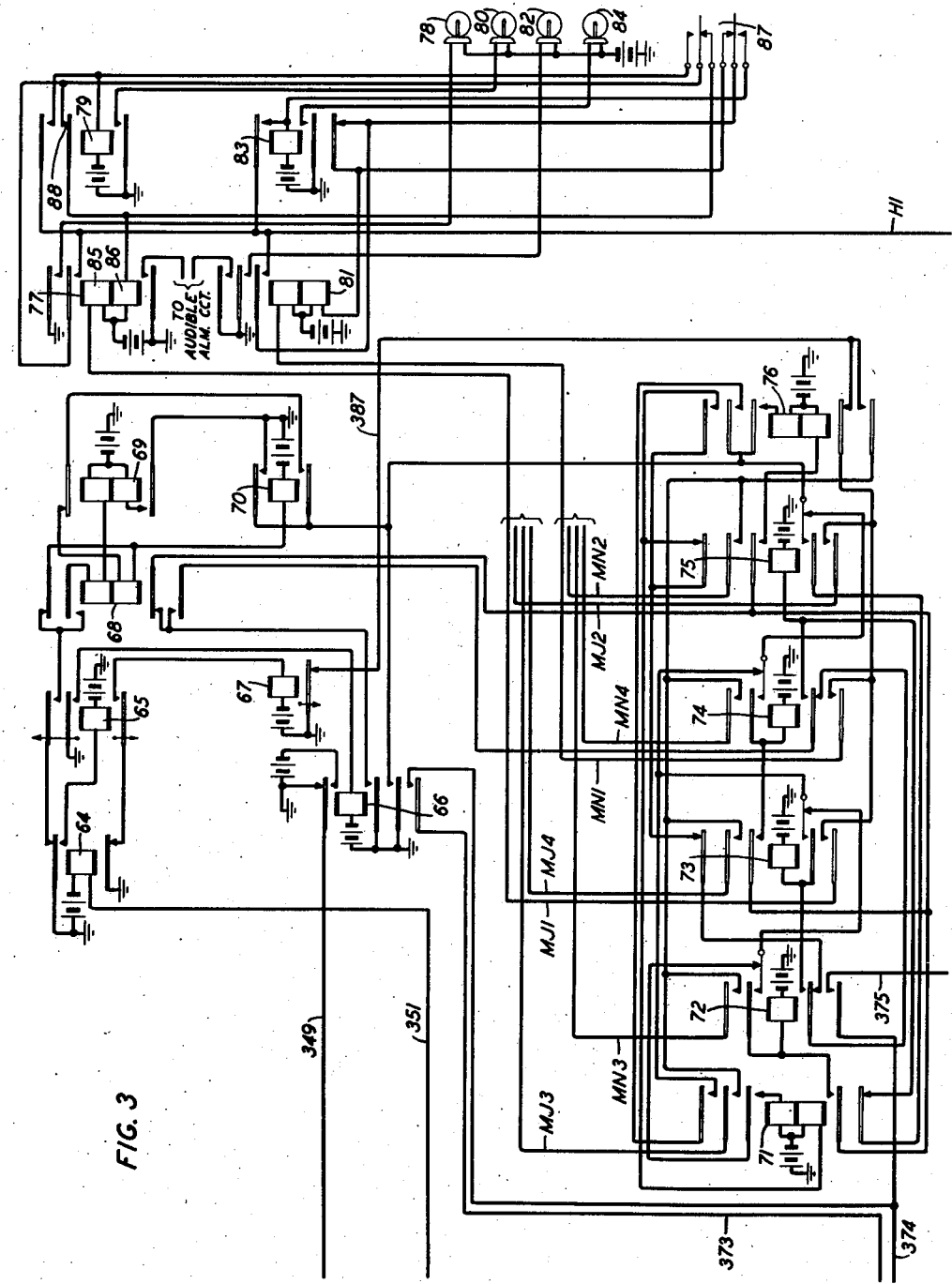
Fig. 3 is a schematic circuit diagram of the attended repeater station of Figs. 1 and 2 showing an alarm receiving circuit in accordance with the specific embodiment of the invention.
Figure 9:
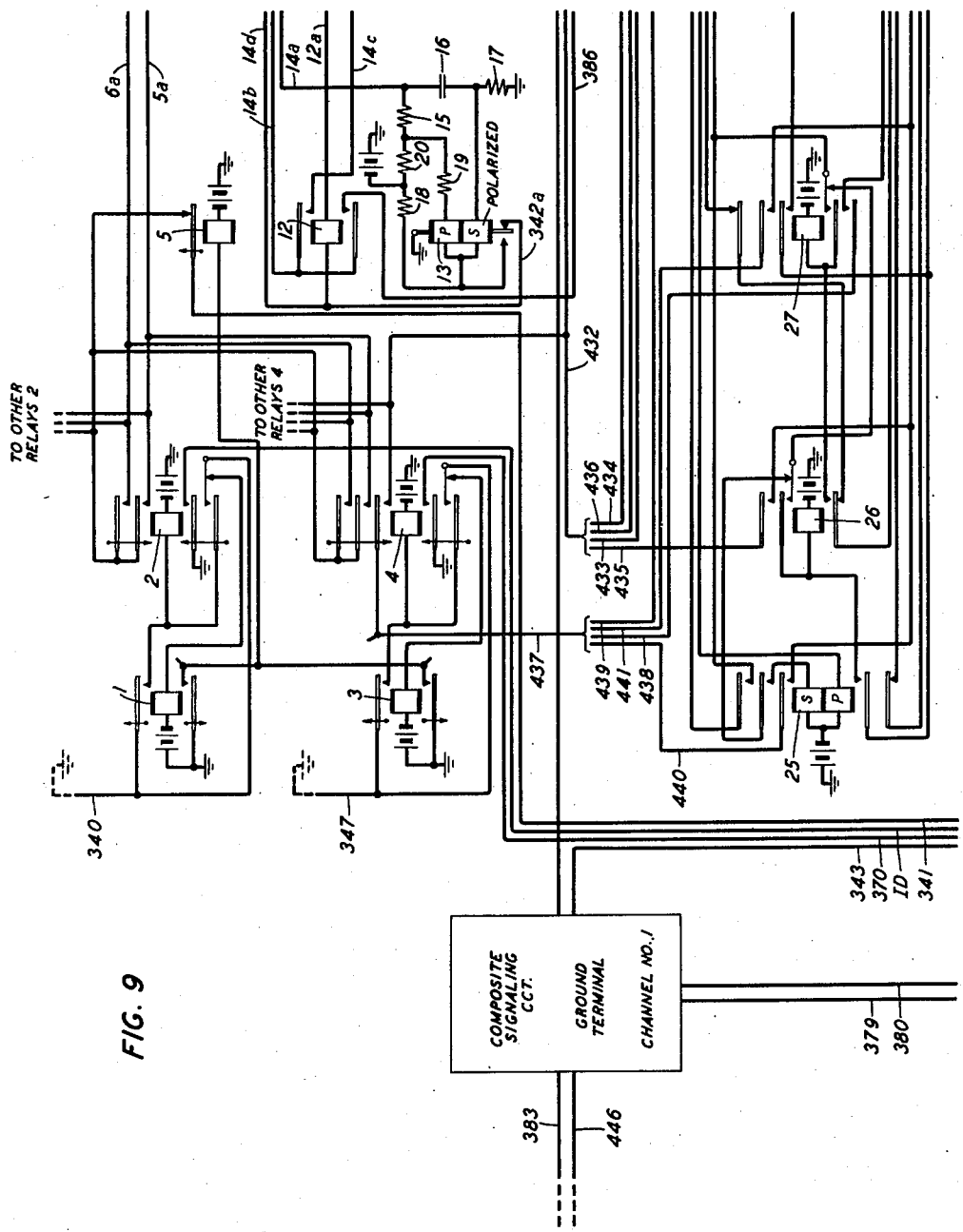
Figs. 9 and 10 are schematic circuit diagrams of the unattended repeater stations of Figs. 1 and 2 showing a station alarm sending circuit and portions of the composite signaling circuit ground and battery terminals in accordance with the specific embodiment of the invention.
Figure 10:
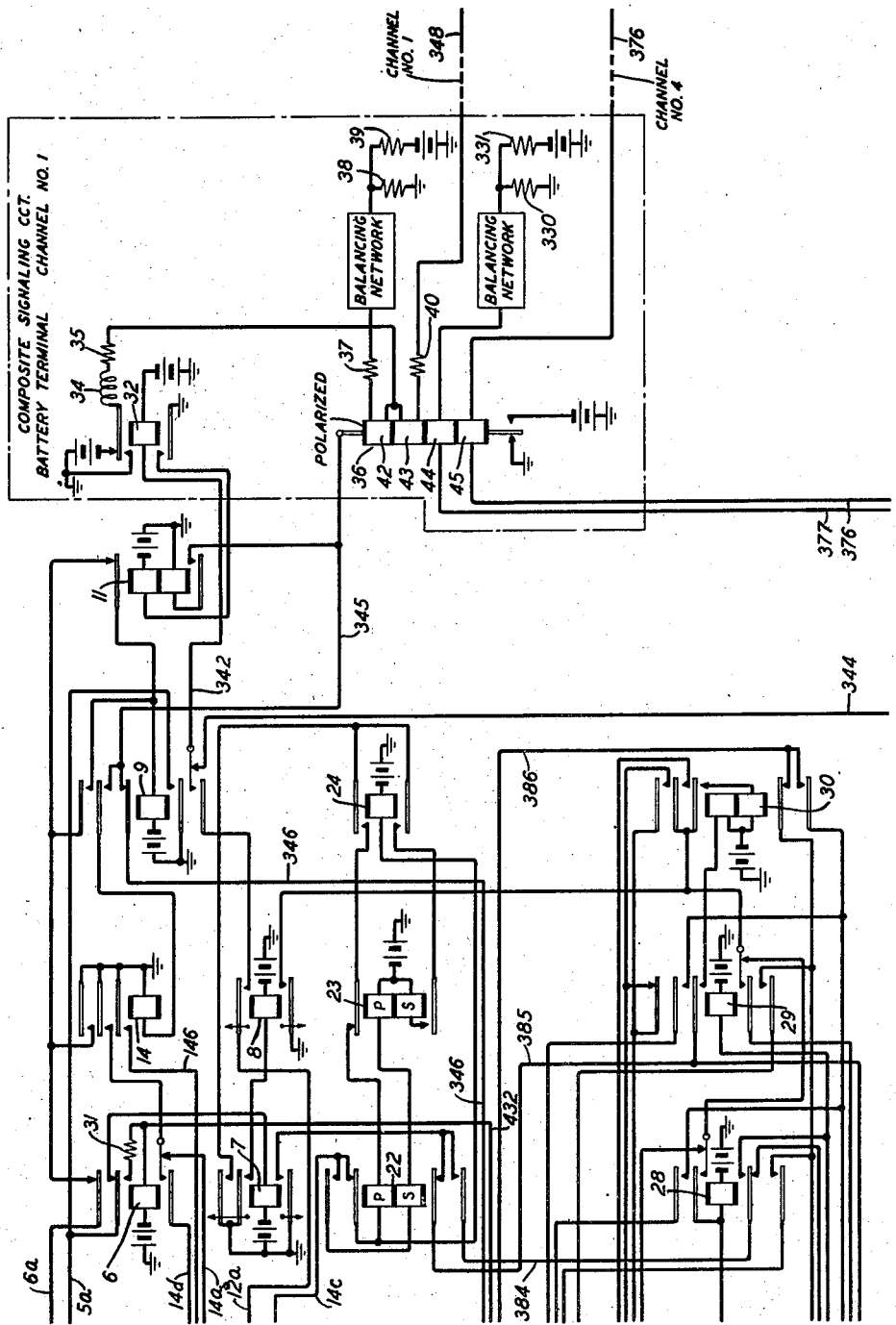

Figs 9 and 10 provide a circuit at each unattended station, for transmitting a major and/or a minor alarm signal to a station alarm receiving circuit, Figs. 20 and 3, located in a distant attended station. This transmitting circuit consists primarily of a pulse generating circuit; a pulse frequency dividing circuit consisting of relays 22, 23 and 24, a reentrant counting chain consisting of relays 25 through 30, and a composite signaling circuit battery terminal. This transmitting circuit also includes a plurality of starting or fault relays 2 and 4, each being adapted to cause this transmitting circuit to seize control of the conductor used for transmitting station alarms and to start the pulse generator circuit to the attended station, in response to the occurrence of a major or minor alarm condition. The pulse generator circuit transmits pulses over the signaling channel connecting each unattended station to the station alarm receiving circuit at the attended station; and also operates the counting chain. Each unattended station transmits an alarm signal in the form of a predetermined number of pulses. Two different pulse numbers are assigned to each unattended station, one number to indicate a minor alarm and a different number to indicate a major alarm. The number of pulses for a major alarm is always one less than the number of pulses for a minor alarm. For example, when ten unattended stations are connected chain-like to the attended stations, the unattended station lying nearest to the attended station may be assigned the code pulses of three and four, three to identify a major alarm and four a minor alarm; the unattended station lying second nearest to the attended station may be assigned the code pulses of five and six; and the third through the tenth unattended stations in sequence may be assigned the code pulses of seven and eight through twenty-one and twenty-two, respectively. Thusly, the code pulses serve to identify both the type of alarm signal, major or minor, and the unattended station in which the alarm signal originated. When the unattended stations are connected in two or more groups to the attended station, a similar code pulse arrangement may be used. When a certain predetermined number of pulses has been produced the local counting chain closes a circuit to operate relay 6 to stop the pulse generator and permit the distant station alarm receiving circuit to register the call on the proper annunciator lamp.

Any fault arising in an unattended station, Figs. 9 and 10, requiring the operation of a minor alarm signal in the station alarm receiving circuit at the attended station, Fig. 3, connects ground to lead 340 which extends through a continuous contact of relay 2, and operating winding of relay 1 to battery. This causes a momentary operation of relay 1 whereby the ground fault on lead 340 is applied via the upper front contact of relay 1 and the operating winding of relay 2 to battery. Relay 2 operates and locks up through its outer lower front contact to the ground fault on lead 340, and interrupts the operating circuit for relay 1. As a consequence of the momentary operation of relay 1, the ground on the lower front contact of this relay is applied to the operating winding of relay 5 to effect the momentary operation thereof. Relay 5 in operating removes holding ground from relay 6 by interrupting its holding circuit comprising operating winding and the upper inner front contact of relay 6, lead 5a, inner upper front contact of relay 2, back contact of relay 5, lead 341 in Figs. 9, 12 and 11, and back contact of relay 159 in Fig. 11. Thus, the operation of relay 5 restores relay 6 to the normally unoperated condition in the event that the latter relay was left locked up as a result of the transmission of a previous alarm signal.

Figure 11:
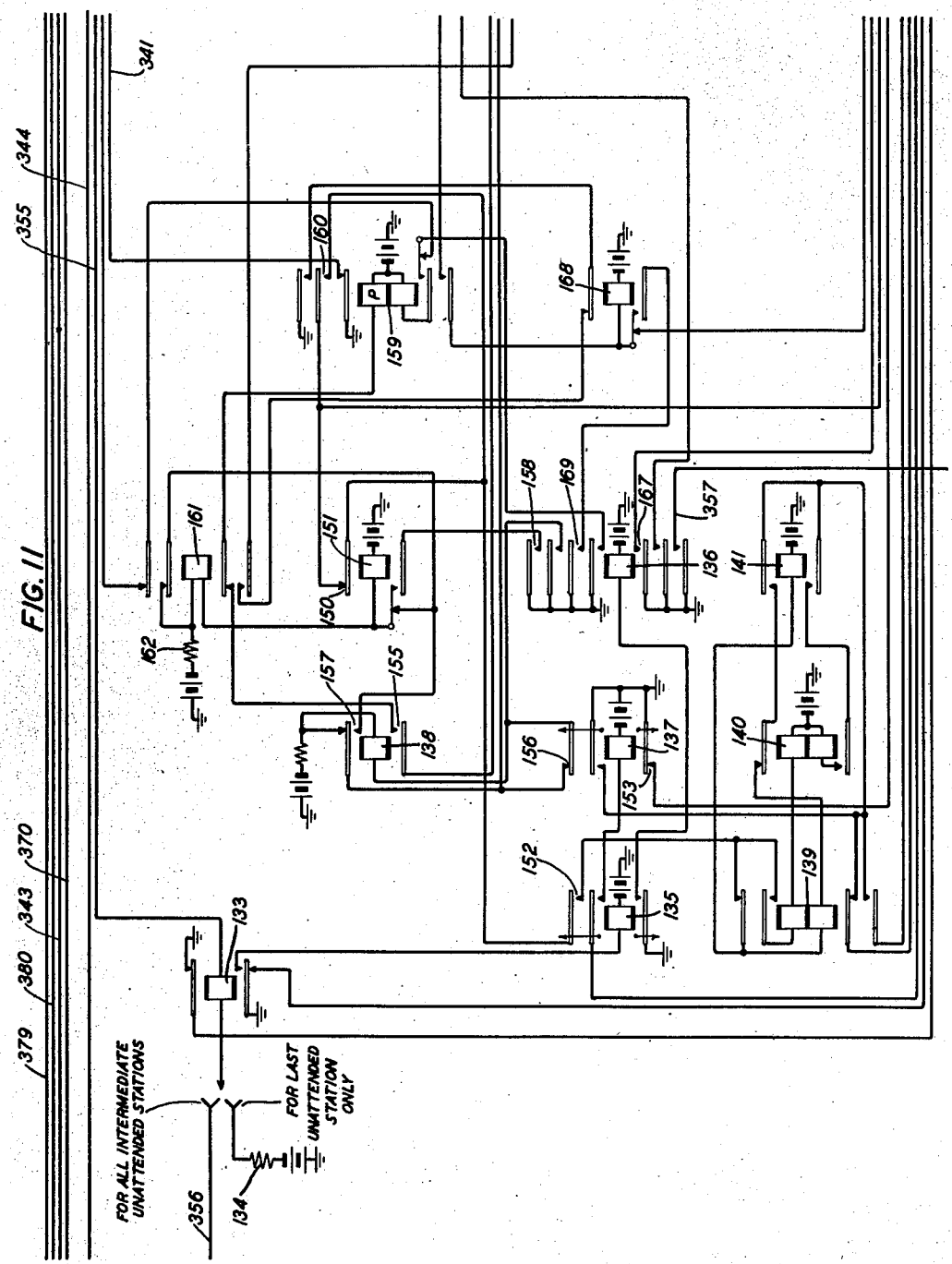
Figs. 11 and 12 are schematic circuit diagrams of the unattended repeater stations of Figs. 1 and 2 showing a receiving director circuit in accordance with the specific embodiment of the invention.
Figure 12:
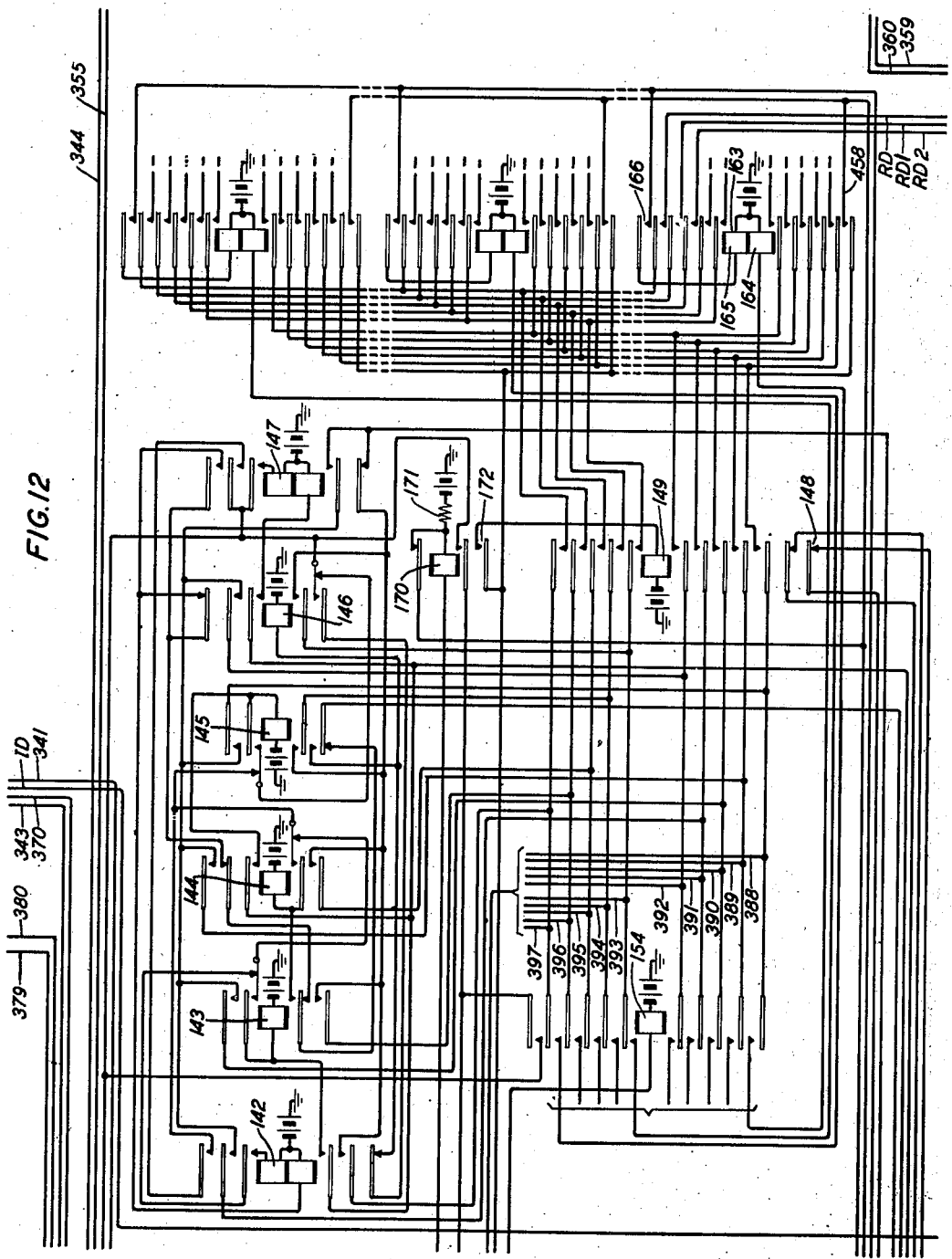

The operation of relay 2 and the restoration of relays 1 and 5 to the normally unoperated condition connect ground from the back contact of relay 159 in Fig. 11, lead 341 in Figs. 11, 12 and 9, back contact of relay 5, upper inner contact of relay 2, lead 5a in Figs. 9 and 10, inner back contact of relay 6, operating winding of relay 7, and battery. Relay 7 operates to connect ground via its inner upper front contact to the operating winding and battery of relay 8 which thereupon operates. Ground on lead 341 is also connected via back contact of relay 5, upper outer contact of relay 2, leads 6 in Figs. 9 and 10, outer upper back contact of relay 6, contact of relay 11, operating winding of relay 9 to battery. The latter relay operates, provided that relay 11 in the unattended station under discussion and possibly in other unattended stations are not being held operated by alarm signals originating in an unattended station located more distantly from the attended station than the unattended station being presently discussed. In the event that alarm signals are in the process of transmission from such more distantly located unattended station, the operation of relay 9 in the unattended station under discussion is delayed until relay 11 in the latter station is released.

For the purpose of this description, it will be assumed at the moment that relay 9 in the unattended station, under present discussion, operates, and further that the same relay in other unattended stations remains in the normally unoperated condition. The operation of relay 9 transfers lead 342 from lead 344, to the upper front contact of relay 8, lead 12a, winding of relay 12, and back contact of relay 13 to ground thereon. It will be understood that normally lead 342 is connected via continuous contact of relay 9 via lead 344, back contact of relay 284 in Fig. 19, and lead 343 to the composite signaling circuit and thereby to the relay 9 in other unattended stations located more distantly from the attended station than the unattended station under discussion at this time in the description. Ground on lead 342a in Fig. 9 operates both relay 12 in Fig. 9 and relay 32 in Fig. 10 at the same time. As a result the ground on the upper front contact of relay 32 is substituted for the battery which is normally on the back contact of this relay. This operation of relay 32 applies ground signal to the junction of windings 42 and 43 of relay 36. From this junction, a ground signal is further applied via winding 43 of relay 36 to lead 348 which extends through winding 49 of relay 54 and lead 349a to ground on contact 453 of relay 447 in Fig. 20. At the same time, the ground signal from the above-noted junction at relay 36 in Fig. 10 is applied via winding 42 of the latter relay to the balancing network connected thereto.

It will be noted that a similar balancing network is connected to winding 48 of relay 54 in Fig. 20. As a consequence, relay 54 operates, but relay 36 does not for reasons which will be hereinafter mentioned. Relay 54 in Fig. 20 in operating produces operations in Figs. 20 and 3 in the attended station that cause a battery signal to be automatically transmitted back over lead 348 to operate relay 36 in Fig. 10 as soon as the attended station is ready to receive additional signals from the unattended station under discussion. Relay 36 now operates and interrupts ground on its back contact and applies battery via its front contact to lead 345, front contact of relay 9 to the operating winding of relay 14. This relay operates to connect ground over its middle front contact, continuous contact of relay 6 and lead 14a to the junction point of resistance 15 and condenser 16 in Fig. 9. This indicates that the signaling channel extending between the unattended station under discussion and the attended station, Figs. 20 and 3, is cleared for signaling transmission therebetween; and simultaneously therewith activates a pulse generator circuit including relay 13 for operation in the manner that will now be explained. In the event an unattended station nearer to the attended station than the unattended station under discussion is in the process of transmitting alarm signals to the station alarm receiving circuit at the attended station, the above-mentioned battery signal returned on lead 348 is delayed whereby the operation of relay 14 is delayed until the signaling lead 348 is cleared for signaling transmission thereover.

In the normal condition, relay 13 in Fig. 9 is held with its back contact closed by the flow of battery current through its secondary winding and resistance 17. When relay 14 is operated to ground the junction point of resistance 15 and condenser 16 as above mentioned, the condenser charges through the secondary winding of relay 13. The direction of flow of this charging current is such that the armature of relay 13 is held against its back contact. Ground on the above-noted junction point of resistance 15 also causes a flow of battery current through resistance 18, primary winding of relay 13 and resistances 19 and 15 to ground. The flow of this current is in the direction tending to operate relay 13 but this current produces fewer ampere turns in relay 13 than the condenser charging current so that the relay remains with its back contact closed until the condenser becomes charged to the point where the ampere turns of the primary winding are greater than the ampere turns of the secondary winding. The latter condition causes relay 13 to operate which thereupon removes ground from the circuit previously traced through the winding of relay 12 and front contacts of relays 8 and 9 to the sending lead 342. This ground removal releases both relays 12 and 32. The release of relay 32 interrupts the ground on lead 348 and thereby transmits to the station alarm receiving circuit the first of a preselected group of similar battery pulses for actuating an appropriate signal indicator in the attended station for identifying the kind of fault, minor or major, and the particular unattended station sending in the alarm.

Relay 13 in operating also connects ground through its front contact to close a circuit from battery through resistances 20 and 19, the primary winding of relay 13 to ground. This causes a current flow in the primary winding of relay 13 in a direction tending to cause the relay to release. Closure of the front contact of relay 13 also closes a path from condenser 16, through the secondary winding of this relay to cause the condenser 16 to discharge and thereby hold the relay operated until the discharge current falls below the value at which it overcomes the current through the primary winding of the relay. Relay 13 then releases to close its back contact. This terminates the operating cycle for effecting the transmission of the first signaling pulse.

When relay 13 releases, ground on its back contact serves to operate relays 12 and 32 again whereby a second ground signal is applied to lead 348; and when relay 13 operates again to release relays 12 and 32, the ground signal on lead 348 is interrupted thereby completing the transmission of the second signaling pulse of the preselected group of signaling pulses. Relay 13 then releases to close its back contact and thereby terminate the operating cycle for the transmission of the second signaling pulse. The operating cycle is repeated approximately at the rate of ten times per second, for example, until the preselected group of signaling pulses has been sent out for the alarm purpose previously mentioned. The circuit will recognize the end of the preselected group of signaling pulses by operating relay 6 and thereby removing ground from the junction point of resistor 15 and condenser 17. The counting of the preselected group of signaling pulses is achieved in a manner which will now be explained.

Relays 22, 23 and 24 in Fig. 10 provide a pulse frequency dividing circuit arranged so that the first closure of both front contacts of relay 12 causes the operation of relay 24, by connecting ground over the inner front contact of relay 14, lead 14b, upper front contact of relay 12, lead 14c, upper back contact of relay 22 to the winding and battery of relay 24. Relay 24 locks up through a circuit including battery and winding of relay 24, primary winding of relay 22, back contact of relay 23, upper front contact of relay 24, outer upper front contact of relay 7 and ground. As a consequence relay 22 operates on its primary winding when relay 12 releases at the end of the first pulse to remove ground from this winding via the front contact of relay 12. The second closure of relay 12 operates relay 23 on its primary winding through the secondary winding of relay 22 and holds relay 22 operated on the latter's secondary winding. The operation of relay 23 opens the previously traced locking circuit for relay 24 whereupon the latter releases immediately. Release of relay 12 at the end of the second pulse opens the holding circuit of relays 22 and 23 so that both of these relays thereupon return to normal. This cycle of operation of relays 22, 23 and 24 is repeated for each two ground pulses received thereat from relay 12.

It will be noted that the above-described sequence of operation causes ground from a lowermost front contact of relay 7 to appear on a front contact of relay 22 after each odd-numbered pulse and causes the same ground to appear on a back contact of relay 22 after each even-numbered pulse.

Relays 25 through 30 in Figs. 9 and 10 provide a reentrant type of counting chain arranged to count a maximum of ten pulses. Obviously, the number of these relays will vary depending on the number of unattended stations included in the system of Figs. 1 and 2 as pointed out later herein. The first closure of lead 384 to the lower front contact of relay 22 causes the operation of relay 25 on its primary winding through contacts of relays 28, 26, 27 and 29 in sequence. Relay 25 in operating locks up on its secondary winding through contacts of relays 25, 26, 27, 28 and 29 in sequence to a ground contact of relay 8. Relay 25 in operating also prepares the counting relay circuit so that the first ground pulse transmitted over lead 385 from relay 22 operates relay 26. Relay 26 in operating releases relay 25 and prepares relay 27 for operation on the next pulse on lead 384. Successive ground pulses transmitted alternately on leads 384 and 385 continue to advance the counting relay chain until relay 29 is operated. The next successive ground pulse transmitted on lead 385 operates relay 30 but does not release relay 29. Relay 30 in operating connects lead 386 to a new set of contacts on relays 25 through 28. Relay 30 when operated remains operated until the entire counting relay circuit has been released upon the completion of the signaling operation. After relay 30 has operated, the next or seventh pulse operates relay 25 for the second time and the counting relay chain continues to advance as long as the pulses are received from the pulse frequency dividing relays 22, 23 and 24.

When the preselected group of pulses has been reached for identifying the particular unattended station as previously pointed out, ground from the lower front contact of relay 12 is applied over lead 386, certain contacts of relays 26 through 29 of the counting relay chain, and one of the optional leads 433 through 436, Fig. 9, to lead 432 which is connected to a front contact of relay 4 and to the winding of relay 6. Relay 6 operates to remove ground from the junction of resistor 15 and condenser 16 and thereby to stop the aforementioned operation of relays 12 and 13. The lower front contact on relay 6 connects ground via a contact of relay 14, lead 14d, winding of relay 12, contacts of relays 8 and 9, lead 342 to the winding of relay 32 and battery. As previously mentioned this transmits a ground pulse to the station alarm receiving circuit in Figs. 20 and 3 in the attended station whereat a suitable alarm is actuated. This alarm will identify the unattended station from which the alarm was received, and whether the alarm was a minor or major one in a manner that will be presently mentioned. Relay 6 in operating locks up through resistance 31 to inner upper front contact of relay 6, lead 5a, upper inner contact of relay 2 and back contact of relay 5 to ground on lead 341. Relay 6 now releases relays 7 and 8 in sequence to release relay 32 and terminate the ground on lead 348 after the alarm has been registered in the station alarm receiving circuit at the attended station, Figs. 1, 2, 20 and 3. Relay 14 remains operated until released by the removal of ground from lead 345 in response to an appropriate signal from the attended station in a manner to be explained later. Relay 14 on releasing then releases relay 9 to connect lead 342 via its continuous contact to lead 344 which is the normal path permitting signaling transmission from more distant stations through the particular unattended station now under discussion and thence on to the attended station.

Relay 9 in releasing also restores the path from lead 345 to lead 346 of the signaling circuit extending toward more distant unattended stations, thereby enabling the transmission of signals from a nearer unattended station to the next more distant unattended station and vice versa.

Any fault condition arising in the unattended station under discussion and requiring the operation of a major alarm signal in the station alarm receiving circuit at the attended station, Figs. 1, 2, 3 and 20 connects ground to lead 347 in Fig. 9 for effecting the operation of relays 3 and 4. The operation of the circuit in Figs. 9, 10 and 11 is the same as that given above for a minor alarm except that one less pulse is transmitted from this unattended station to the attended station. In this case ground from the lower front contact of relay 12 is applied over lead 386, one of the optional leads 438 through 441, and lead 437 to a contact of relay 4 and thereby to lead 432 which is connected to the winding of relay 6 as previously mentioned. The operation of relay 4 therefore ties together leads 432 and 437 so that all signals transmitted from the unattended station under discussion will appear in the station alarm receiving station of the attended station, Figs. 1, 2, 20 and 3 as a major alarm until relay 4 has been released.

As shown in Figs. 1 and 2, it will be understood for the purpose of this explanation that the unattended station nearest to the attended station is adapted to transmit three pulses to indicate a major fault and four pulses to indicate a minor alarm; the second nearest unattended station to send five and six pulses to indicate the major and minor faults; and the remaining unattended stations to use an increasing number of pulses as explained hereinbefore. In this connection it will be obvious that the number of relays included in the reentrant counting chain of relays 25 through 30 will depend on the number of unattended stations included in the system and therefore the number of signal pulses that will require counting. Where the pulses to be counted are less than ten in number, the counting relay chain will obviously advance only part way; and where the pulses are more than ten, the counting relays 25 through 30 will include an adequate number of relays to perform the required counting.

For purposes of recheck of the above-mentioned minor and major alarms, each operation of relay 159, in a manner that will be subsequently identified, of the receiving director circuit in Figs. 11 and 12 removes ground from lead 341 whereupon relay 6 is released if relay 6 happened to be operated as a result of having transmitted an alarm signal in a previous operation. Reapplication of ground to lead 341 in response to the operation of the receiving director circuit causes relay 9 to reoperate and the circuit in Figs. 9 and 10 repeat the above-explained procedure of transmitting a minor or major alarm depending on whether relays 1 and 2 or 3 and 4 were initially operated. This will serve to distinguish transitory and permanent faults. A permanent fault will cause a reactuation of the fault or alarm indicator in the attended station whereas a transitory fault will fail to cause a reactuation of such fault or alarm indicator.

In order to provide means for transmitting an additional alarm signal from each unattended station while an alarm signal therefrom is effective in the above manner, it is necessary to provide as many relays 1 and 2 as there are possible sources of minor alarms and as many relays 3 and 4 as there are possible sources of major alarms. Relay 1 or 3 will cause a momentary operation of relay 5 in Fig. 9 to release relay 6 and thereby cause a repetition of the minor or major alarm sending cycle each time an additional relay 2 or 4 is operated for each new fault. Relays 2 and 4 also provide indication leads ID whose purpose will be explained later herein.

The composite signaling circuit ground terminal for receiving signals from more distant stations is shown in the box in Fig. 9; and it will be understood that this signaling circuit is identical with the composite signaling circuit illustrated in detail in Fig. 20. Alarm signals from the more distant stations are received over lead 383 by the composite signaling circuit in Fig. 9, and sent therefrom over lead 343, through back contact of relay 284 in the cable failure alarm sending circuit, Fig. 19, lead 344, continuous contact of relay 9, lead 342 to the winding of relay 32 in Fig. 10. Relay 32 operates in the manner previously explained to pass the signals to the station alarm receiving circuit.

*Composite signaling circuit—Battery terminal— Channel No. 1—Unattended repeater station*

As mentioned previously herein, the pulses from the pulse generator including relays 12 and 13 in Fig. 9 are sent over lead 342 and transmitted over the signaling lead 348 in Fig. 10 to the station alarm receiving circuit in attended station, Figs. 20 and 3. In the normal condition in Figs. 20 and 3, 9 and 10, lead 342 is connected to lead 344 in Fig. 10; and relay 32 in Fig. 10 is released whereby battery is applied to a circuit including the back contact of relay 32, noise attenuating coil 34, and resistance 35 in Fig. 10. After the latter resistance, the circuit splits into two branches; a first branch including winding 42 of relay 36, resistance 37, a balancing network constituting an artificial line to balance the lead 348, and junction of resistances 38 and 39 forming a potentiometer between ground and battery for reducing the voltage applied to the balancing network to one-half of the battery potential and a second branch including winding 43 of relay 36, resistance 40, line lead 348 in Fig. 10 and lead 348, resistor 58, and winding 49 of relay 54 in Fig. 20. After this point the circuit divides into two branches; a first branch including winding 48 of relay 54, resistor 55, a balancing network constituting an artificial line to balance the line lead 348, and junction of resistances 56 and 57 forming a potentiometer between ground and a battery for reducing the voltage applied to the balancing network to one-half of the battery voltage and a second branch including resistor 47, noise attenuating coil 46, lead 349a, contact 453 of relay 447 and ground.

With battery applied to the back contact of relay 32 in Fig. 10 (and thereby to the associated end of lead 348) and ground applied to contact 453 of relay 447 in Fig. 20 (and thereby to the associated end of lead 348), the current through the winding 43 of relay 36 flows over line 348 in a direction tending to operate relay 36 to its back contact. At the same time, the flow of current over line 348 and through winding 42 of relay 36 is in a direction tending to operate this relay to its front contact. However, the amount of current in winding 43 is approximately twice that in winding 42. As a consequence relay 36 remains on its back contact. With relay 36 in the foregoing condition, ground is applied via its back contact to lead 345.

When, however, battery is applied to the distant end of lead 348 via relay 66 lead 349 in Fig. 3 and contact 454 or relay 447 to lead 349a for a purpose that will be mentioned later, the current flow on lead 348 becomes zero whereby relay 36 operates to its front contact by the flow of current in winding 42 alone. This opens the back contact of relay 36 to remove ground from lead 345 and closes the front contact of this relay to connect battery to lead 345. When ground is applied to the lead 342, relay 32 operates and connects ground to its front contact. This reestablishes the condition of current flow on lead 348, and reverses the direction of current flow in the balancing network and winding 42 of relay 36. In a balanced circuit, the differential current in the windings 42 and 43 of relay 36 remains unchanged. Relay 36 will, therefore, fail to respond to changes of potential applied to its windings 42 and 43, and will remain under control of the potential applied at the distant end of lead 348 via relay 66 in Fig. 3 as above stated.

*Composite signaling circuit ground terminal— Attended repeater station*

In the idle condition of the composite signaling circuit in Fig. 20, ground at contact 453 of relay 447 is connected over the 349a lead and noise attenuating coil 46 to resistance 47. Immediately after this resistance the circuit divides into two branches; one branch including winding 48 of relay 54, resistance 55, balancing network, and the junction of resistances 56 and 57 which form a potentiometer which reduces the potential applied to the balancing network to one-half the battery voltage and a second branch comprising winding 49 of relay 54, resistance 58, line conductor 348 and the previously identified equipment terminating the end of the line conductor 348 in the battery as shown in Fig. 10.

Windings 52 and 53 of relay 54 are connected in a vibrating circuit identified below and controlled by the front and back contacts of relay 54. Windings 59 and 60 of relay 61 are connected in series with winding 53 of relay 54 so that the operation of relay 61 follows the operation of relay 54 for transferring ground from lead 350 to lead 351a and vice versa. With ground on lead 349a in Fig. 20 and battery on lead 348 at the distant end of the line 348 in Fig. 10, the current flow through winding 49 of relay 54 is in a direction tending to operate relay 54 to its front contact while the current flow through winding 48 has the opposite effect but the amount of the latter current is only half the amount of current in the winding 49. As a consequence relay 54 operates. When the front contact of relay 54 is closed, condenser 62 is charged through winding 52 and current flows through winding 53 and the both windings of relay 61. The current through winding 53 of relay 54 tends to operate it to its back contact but does not overcome the magnetic effect of the differential current in windings 48 and 49 of relay 54. The current in both windings of relay 62 holds the armature of relay 61 against its back contact whereby ground is connected to lead 350 associated therewith.

When ground is applied to the end of conductor line 348 via the lower front contact of relay 32 in Fig. 10, the line current becomes zero and relay 54 is operated to its back contact by the current flow in its winding 48. Before the front contact of this relay is opened, however, the current through winding 53 aids the current flow in winding 48. When the armature of relay 54 opens its front contact, condenser 62 discharges through the windings 53 and 52 in series to aid the current flow through winding 48. When the back contact of relay 54 is closed, current flow through winding 52 for charging condenser 62 is in a direction tending to hold the front contact closed. The current flow through winding 53 and windings 59 and 60 is reversed but builds up slowly due to the voltage drop in resistance 63 during the charging interval of condenser 62. This reversal of current operates relay 61 to its front contact whereby ground is applied to lead 351a. When battery is reapplied to the end of conductor line 348 in Fig. 10 as above mentioned, relay 54 will return to its front contact. The vibrating circuit including relay 54 will assist in the same manner as it did during the operation in the opposite direction as just described. The arrangement of the vibrating circuit to include the winding of relay 61 permits a voltage swing in the vibrating circuit which is substantially twice as large as could be obtained if relay 61 were operated in a circuit independent of the vibrating circuit.

When the potential applied to lead 349a in Fig. 20 is changed from ground to battery by the operation of relays 66 and 447, the condition of current or no current on the line 348 at a given instant is reversed. The direction of current flow in the balancing network is reversed at the same time so that the direction and magnitude of the differential current in the windings 48 and 49 of relay 54 remains unchanged. Relay 54 will, therefore, not respond to changes of potential on the lead 349a but will remain exclusively for the moment under the control of the potential applied to the end of line 348 via relay 32 in Fig. 10 in the manner previously explained.

The foregoing description of the operation of the composite signaling circuit ground terminal in Fig. 20 and of the composite signaling circuit battery terminal in Fig. 10 is the same for all similar terminals shown in Figs. 1 and 2.

*Station alarm receiving circuit*

The station alarm receiving circuit in Figs. 3 and 20 operates to count signal pulses transmitted from the station alarm sending circuit located in each distant unattended station as hereinbefore described and to register such signals on annunciator lamps 78, 80, 82 and 84. For counting the received signal pulses Fig. 3 contains a pulse frequency dividing circuit consisting of relays 68, 69 and 70, and a reentrant type of counting chain consisting of relays 71 through 76 which is adapted to count a maximum of ten pulses. Obviously, the number of these relays will vary depending on the number of unattended stations included in the system of Figs. 1 and 2 as mentioned previously herein. Also as above discussed, the nearest unattended station equipped with the station alarm sending circuit, Figs. 9 and 10, transmits three pulses for a major alarm and four pulses for a minor alarm; and the more distant stations use a larger number of pulses for identifying the major and minor alarms therein. Where less than ten pulses are to be counted the counting relay chain will advance only part way; and where more than ten pulses are to be counted, the counting relay chain will include sufficient relays to perform the necessary counting. For each unattended station, Figs. 1 and 2, equipped with a station alarm sending circuit per Figs. 9 and 10, the attended station includes a group of relays 77, 79, 81 and 83, and a group of lamps 78, 80, 82 and 84.

When the station alarm sending circuit per Figs. 9 and 10 in each unattended station is required to actuate an alarm at the attended station in Figs. 20 and 3, a signal over the composite circuit channel No. 1 per Figs. 10 and 20, applies ground to lead 351a in the manner aforementioned. Relays 447 through 452 provide an interlock feature so that the portion of the station alarm receiving circuit shown in Fig. 3 can be connected to only one composite signaling circuit ground terminal at a time. If relays 447 through 452 are in their normal positions when relay 61 operates to connect ground to lead 351a, this ground operates relay 447 through contact 455 of relay 452. Relay 447 in operating connects lead 351a to lead 351 to operate relay 64 in Fig. 3 on ground from relay 61. Relay 64 operates relay 65 which in turn operates relay 66 to provide holding ground for the above-identified counting relay chain in Fig. 3. Relay 65 is a slow-releasing type and will therefore remain operated while signal pulses are being transmitted through relay 64. Relay 66 in operating transfers lead 349 from ground to battery. This battery is connected through contact 454 of relay 447 to lead 349a, in order to transmit a battery signal to the station alarm sending circuit in the distant unattended station to cause the latter station to start to transmit signal pulses to identify itself. Battery from lead 349 and contact 456 of relay 447 also operates relay 451 which in turn operates relay 452 to prevent operation of relay 448, 449 or 450 while leads 351 and 349 are connected to leads 351a and 349a to enable the attended station to receive signals from a particular composite signaling ground terminal on channel No. 1. When relays 447 through 452 are in their unoperated positions, ground from a composite signaling circuit ground terminal connected to lead 351b, 351c or 351d will operate relay 448, 449 or 450 and relays 451 and 452 to connect a particular composite signaling circuit ground terminal to leads 351 and 349 in Fig. 3 and exclude all other composite signaling circuits while alarm signals are being received at the attended station.

When an unattended station transmits signal pulses, each pulse received in Fig. 3 causes a momentary release of relay 64. Ground through the lower back contact of relay 64 and the lower front contact of relay 65 serves to operate relay 67 and causes the latter to remain operated as long as the ground signal pulses are being received via relay 64. Ground from an upper back contact of relay 64 operates the pulse frequency dividing circuit consisting of relays 68, 69 and 70 whose pulses are then counted by the counting chain consisting of relays 71 through 76. The operation of the pulse frequency dividing circuit and the counting chain included in relays 68 through 76 as above identified is identical with the operation of corresponding relays included in the group 22 through 30 in Figs. 9 and 10 as previously explained.

As the counting relay chain in Fig. 3 advances, it will be noted that lead 387 is connected successively to leads MJ1, MN1, MJ2, MN2 and thereby to relays 77 and 81 for identifying the unattended station under discussion or other groups containing similar relays for identifying other unattended stations in Figs. 1 and 2 as above explained. If the signal pulses incoming from the unattended station constitute a quantity less than 10, the counting chain, 71 through 76 relays, advances only part way. After the last or final ground signal pulse of the group has been received, the slow-releasing relay 67 releases to place ground on lead 387. This ground will be effective through the counting relay chain 71 through 76 until it reaches one of the leads MJ1 etc. and MN1 etc. to one of the sets of relays 77, 79, 81 and 83 adapted to register the number of pulses for identifying the major or minor alarm. After sufficient time has elapsed to permit the registration of the fault signal, the distant unattended station originating the signal pulses effects the release of relay 64 by removing ground from the front contact of relay 61. This releases relays 65 and 66 to remove the battery signal from lead 349 extending to the distant unattended station sending in the alarm signals and thereby releases all relays in Fig. 3 except relays 77, 79, 81 and 83.

Each group of relays 77, 79, 81, 83 is connected to certain leads from the counting relay chain 71 through 76 so that each relay group for each unattended station will receive ground when its associated station alarm sending circuit located at a particular unattended station operates to send out alarm signals. Ground on lead MJ1 operates relay 77 on its winding 85 whereupon the latter relay locks up on its winding 86 through (1) a contact of station alarm cut-off key 87 and its inner upper front contact to one of the H leads extending to a sending director circuit, Fig. 5, whose function will be explained later and (2) or a back contact of relay 79. Ground on the outer upper front contact of relay 77 operates lamp 78. Ground on a lower front contact of relay 77 serves to operate a suitable audible alarm, not shown, to attract the attention of maintenance personnel to the occurrence of the alarm. Relay 77 may be released by an appropriate operation of the sending director circuit in Fig. 5 to transmit a signal over line lead 348, Fig. 10, to the distant unattended station from which the alarm signal was received. The transmission of such signal serves to remove ground momentarily from the appropriate H lead in the sending director in Fig. 5 whereupon the relays operated in Fig. 3 are released to restore the circuit of the latter figure to normal. It will be understood that the transmission of such signal from the sending director circuit in Fig. 5 will have no effect on the fault condition in the distant unattended station in Figs. 9 and 10 sending in the alarm; and that in due course the distant unattended station alarm sending circuit repeats the alarm signal above explained. Obviously, the alarm cannot be permanently wiped out until the fault condition causing the alarm is corrected at the distant unattended station.

The audible alarms in Fig. 3 may be silenced by the momentary operation of the station alarm cut-off key 87. If this key is operated while relay 77 is operated, ground from the H lead, inner upper front contact of relay 77 and front contact of the key operates relay 79. This relay in operating locks up to the H lead through its upper front contact, and interrupts the holding circuit for relay 77 by opening its back contact 88. Release of relay 77 removes ground from the associated audible alarm and lamp 78. Relay 79, in operating applies ground to lamp 80 which provides for the silent storage of the alarm signal. Relay 79 can be permanently released after the alarm condition has been corrected at the distant unattended station by the operation of the sending director circuit in Fig. 5 to transmit an appropriate signal to the distant unattended station. When an additional alarm signal is received while lamp 80 is energized relay 77 is reoperated so that both lamps 78 and 80 will be energized and the associated audible signal is again operated. Operation of the station alarm cut-off key 87 will then release relay 77 and leave lamp 80 lighted as above explained. Thus, ground on leads MJ1, MJ2, etc. energizes lamps 78 and 80 to indicate the occurrence of a major alarm. Minor alarms are registered and stored by means of leads MN1, MN2, etc., relays 81 and 83 and lamps 82 and 84 all of which are operated in a manner similar to the operation of leads MJ1, MJ2, etc., relays 77 and 79 and lamps 78 and 80 just described. As hereinbefore mentioned, each unattended station according to Figs. 9 and 10 transmits two different sequences of signal pulses to identify major and minor alarms, the major alarm requiring one less pulse. The permanent registration of the major and minor alarms are also shown in Fig. 2.

*Sending director circuit in attended repeater station*

Figure 5:
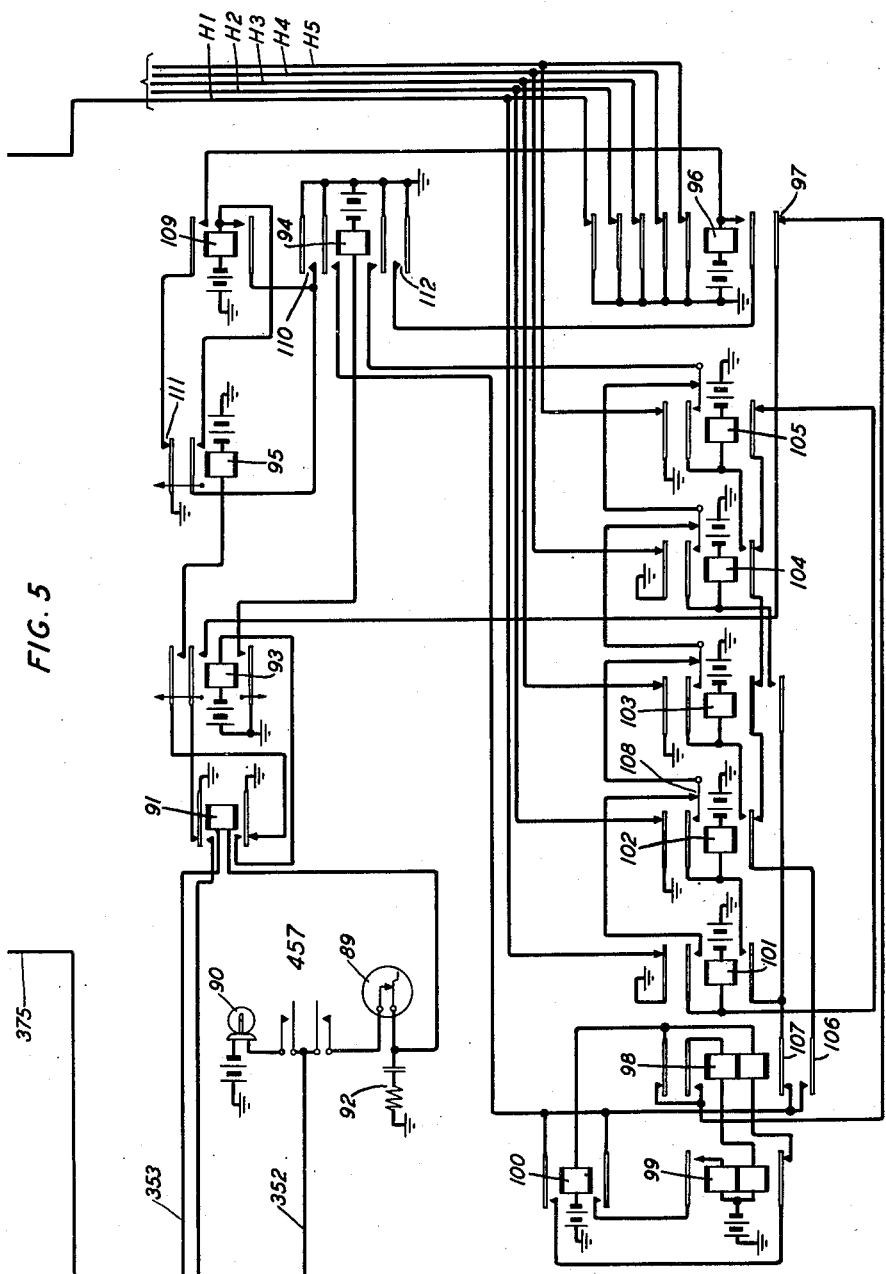
Fig. 5 is a schematic circuit diagram of the attended repeater station of Figs. 1 and 2 showing the sending director circuit.

The sending director circuit, Fig. 5, is included in the attended station and provides a dial 89 for transmitting signals over channel No. 2, for lead 354, of a composite signaling circuit to each of the unattended stations equipped with a receiving director circuit which will be explained later. The sending director signals consist of a group of three digits, each of which may be one of 0 through 9, the first digit indicating the station to which the signal is addressed and the remaining two digits indicating the action to be taken at such station. The remainder of the circuit in Fig. 5 includes a group of relays for counting the pulses in the first digit of each sending director signal in order to identify the particular unattended station for which the signal is intended. After determining that station the circuit of Fig. 5 operates to remove holding ground from a particular H lead and thereby deenergizes the annunciator lamps 78, 80, 82 and 84 in Fig. 3 which were energized initially by the alarm circuit of the identified unattended station in the manner hereinbefore explained. Since the receiving director circuit at the identified unattended station causes a repetition of the signals identifying the existing alarms at the latter station, this results in a reenergization of the annunciator lamps at the attended station as above described whereby a recheck of alarm conditions at the respective unattended stations is affected each time the sending director circuit is operated.

Figure 4:
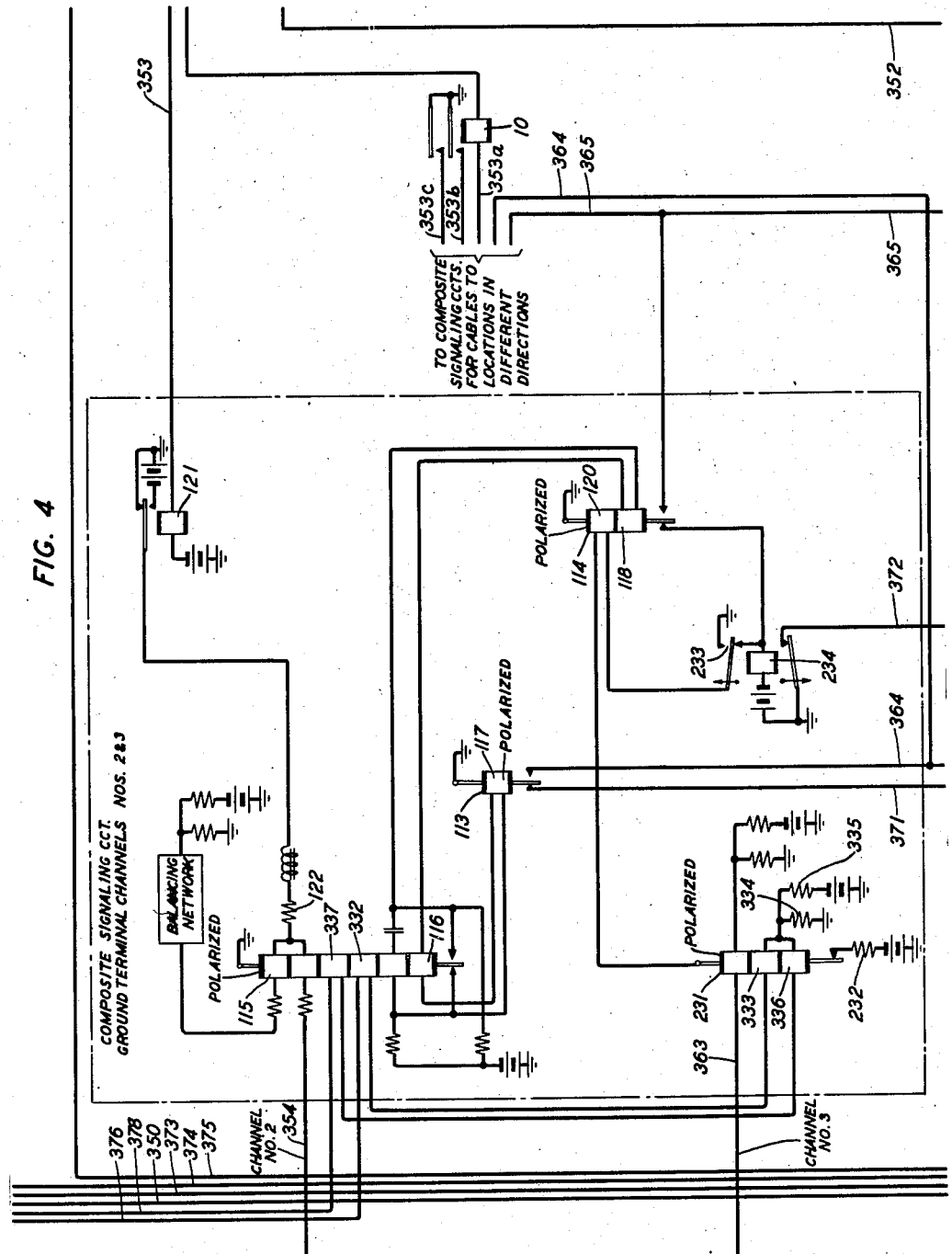
Fig. 4 is a schematic circuit diagram of the attended repeater station of Figs. 1 and 2 showing a portion of the composite signaling circuit ground terminal.
Figure 6:
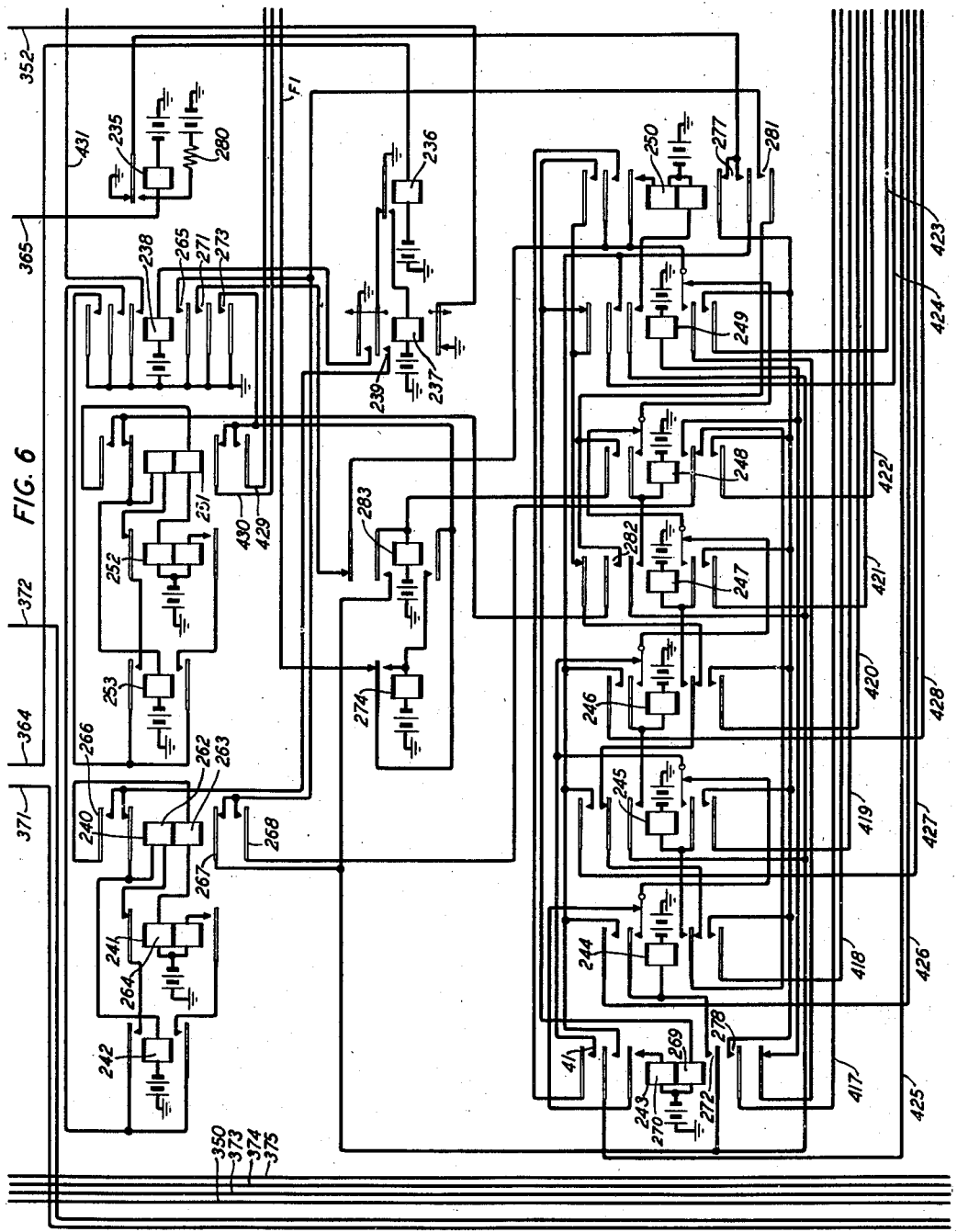
Figs. 6 and 7 are schematic circuit diagrams of the attended repeater station of Figs. 1 and 2 showing an indication receiving circuit in accordance with the specific embodiment of the invention.
Figure 7:
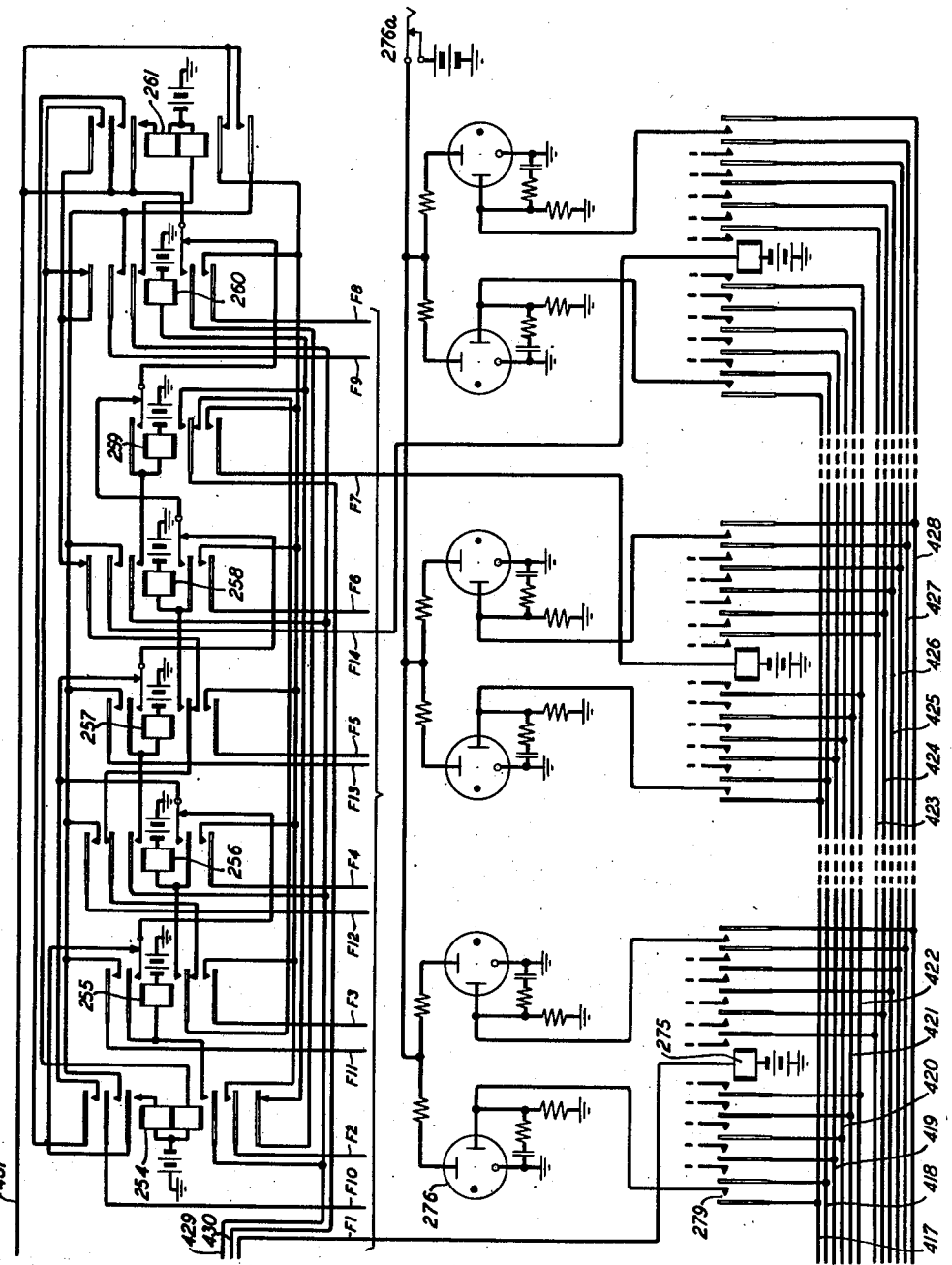

When the sending director circuit in Fig. 5 is in operation, ground is supplied to lamp 90 and dial 89 over lead 352 by associated indication receiving circuit, Figs. 6 and 7. This ground is removed from lead 352 by the operation of the indication receiving circuit in order to prevent sending director signals from interfering with the operation of the indication receiving circuit. The pulsing circuit of the dial 89 may be traced via winding of relay 91 and lead 353 to sending relay 121 in composite signaling circuit ground terminal channel No. 2. The network 92 consisting of a condenser and resistor is provided to aid in producing dial pulses with approximately 50 per cent open and closed periods. The upper front contact of relay 91 and relay 10 in Fig. 4 provide means for transmitting director signals over leads 353a, 353b and 353c to lead 353 of additional composite signaling circuit ground terminals in order to reach unattended stations connected to the attended station by means of additional cables. Relay 91 is adapted to operate the counting relays in Fig. 5 to remove ground from one of the H leads extending to the station alarm receiving circuit in Fig. 3 each time the sending director circuit is operated in a manner that will now be explained.

When a sending director signal is transmitted, relay 91 via ground on its lower front contact operates relay 93 which in operating, operates relay 94 to provide a holding ground for various parts of the circuit of Fig. 5. Relay 93 is a slow release type so that both relays 93 and 94 remain operated while dial pulses are being transmitted. The first dial pulse operates relay 95 through a front contact of relay 93 and a lower back contact of relay 91. Relay 95 holds over between dial pulses and remains operated until the end of the digit. Ground on the upper back contact of relay 91, a front contact of relay 93 and back contact 97 of relay 96 operates the pulse frequency dividing circuit consisting of relays 98, 99 and 100. The operation of these relays is the same as relays 22, 23 and 24 in Fig. 10. Relays 101 through 105 provide a straightforward counting chain to count the dial pulses. Ground from contact 106 of relay 98 may be traced through a path including back contacts of relays 102, 103, 104 and 105 and winding of relay 101 which operates on the first dial pulse. Relay 101 in operating prepares the circuit so that ground from contact 107 of relay 98 will operate relay 102 on the second pulse. Relay 101 locks up through continuous contacts of relays 102, 103, 104 and 105 to ground on a front contact of relay 94. Relay 102 in operating releases relay 101 by means of contact 108 on the former. The counting chain continues to step forward until the end of the first digit is reached. The relays 101 through 105 are arranged to count five pulses, and additional relays may be added to the counting chain for counting up to and including ten pulses. At this point, a relay in the counting chain corresponding to the number of pulses in the first digit remains operated and relay 95 releases. Relay 95 in operating at the beginning of the digit operated relay 109 via contact 110 of relay 94 and locked up the latter relay to this contact. Relay 95 in releasing at the end of the first digit operates relay 96 through its 111 contact and a front contact of relay 109. Relay 96 in operating locks up to contact 112 of relay 94 and interrupts the pulsing lead to the pulse frequency dividing circuit 98, 99 and 100 so that the dial pulses of subsequent digits are not counted. Relay 96 in operating also removes ground from the H leads. When relay 96 operates, the H lead corresponding to the operated relay in the counting chain becomes ungrounded but leaves ground on all remaining H leads through contacts on other relays of the counting chain. When additional digits are dialed, relay 91 follows the pulses and relay 95 operates and releases on each digit, but none of the other relays in this circuit changes its condition until the dial key 457 is released, whereupon all relays in Fig. 5 are returned to the normally non-operated condition.

Composite signaling circuit ground terminal in attended repeater station

The composite signaling circuit ground terminal channel No. 2 in Figs. 2 and 4 is similar to the composite signaling circuit ground terminal channel No. 1 except the former circuit has added thereto relays 113 and 114, whose operation will be explained later, and sending relay 121 which serves to reverse the condition of current or no current on line lead 354. The lead 353 from the sending director circuit, Fig. 5, is connected through the winding of sending relay 121. Ground applied to the lead 353 operates relay 121 and thereby substitutes battery for the ground that was normally on resistance 122. Signals are sent over line lead 354 to the composite signaling circuit battery terminal, Fig. 13, and thence to a receiving director circuit, Figs. 11 and 12 included in the unattended station transmitting the initial alarm signal.

Composite signaling circuit battery terminal in unattended repeater station

Figure 13:
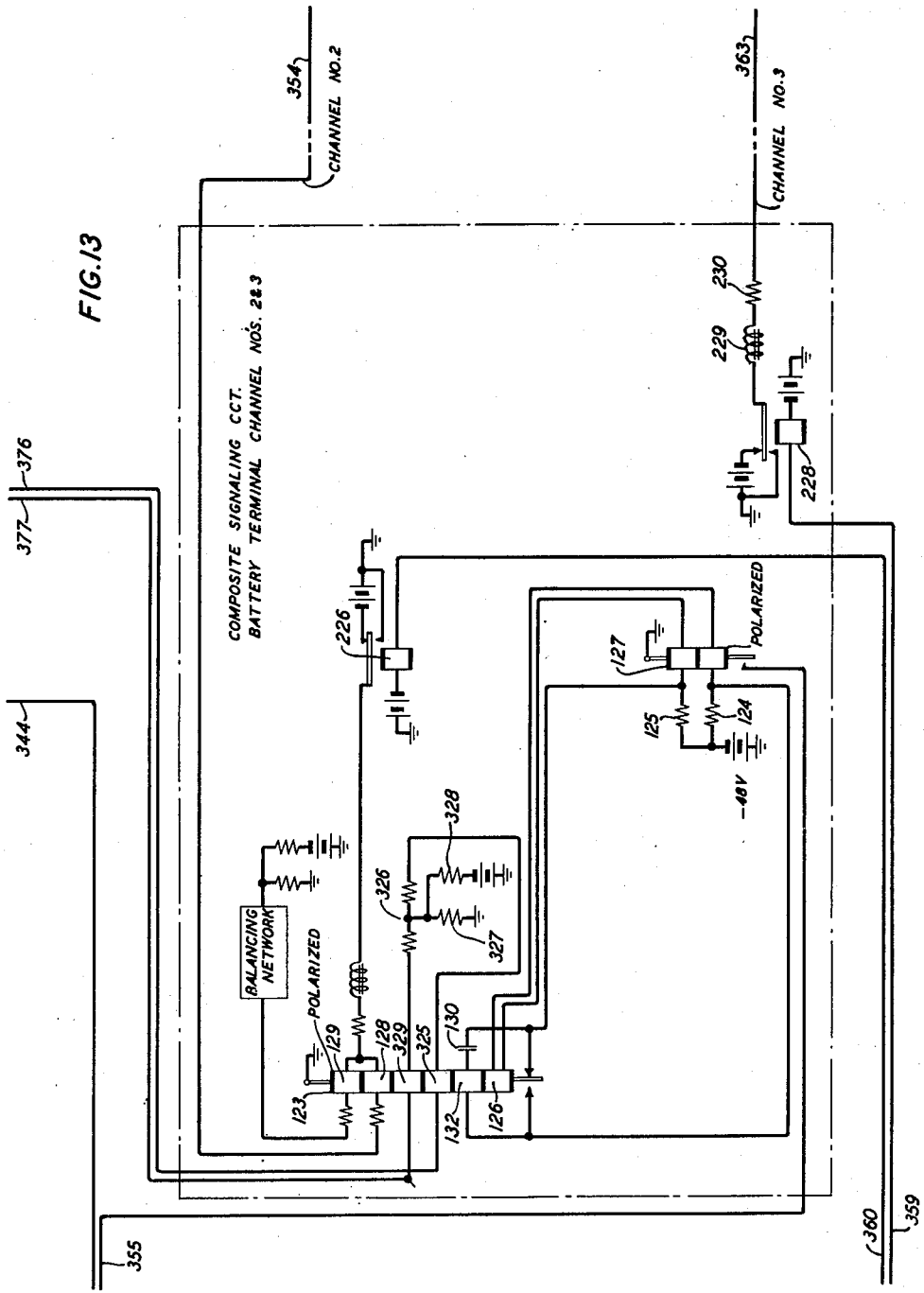
Fig. 13 is a schematic circuit diagram of the unattended repeater stations in Figs. 1 and 2 showing a further portion of the composite signaling circuit battery terminal of Fig. 10.

Fig. 13 provides a composite signaling circuit battery terminal for receiving order signals sent over channel No. 2. This circuit is similar to the composite signaling circuit battery terminal for channel No. 1 described above in connection with Fig. 10 except a vibrating circuit is connected to a back contact and windings 126 and 132 of relay 123. Ground is connected to the armature of relay 123 and a battery is alternately connected to its front and back contacts through resistances 124 and 125, respectively. Current flows from battery through one of these resistances, winding 126 of relay 123, and both windings of relay 127 in series aiding and back contact of relay 123 to ground. This current opposes the differential current in the windings 128 and 129 of relay 123. Condenser 130 in series with the winding 132 is also bridged across the front and back contacts of relay 123.

During the transmission of pulses from the attended station of the system shown in Fig. 2, the differential current in windings 128 and 129 is reversed on each pulse. As the differential current approaches zero, the current in winding 126 takes control and operates relay 123 to its front contact. During the armature travel time, the discharge of the condenser 130 through windings 126 and 132 in series aiding keeps the armature moving in the direction in which it started. When the armature closes the back contact, the charging current for the condenser 130 causes a large current to hold the contact closed. This is opposed by the current in winding 126 which builds up slowly due to the voltage drop in the resistances 124 and 125 caused by the charging current. As the current in winding 126 increases, the current in winding 132 decreases but before the difference is great enough to cause the armature to leave the contact, the differential current between these two windings reaches a value which is high enough to hold the armature on the back contact. Relay 127 follows relay 123. When relay 123 closes its front contact, relay 127 closes its front contact. The latter connects ground to lead 355 to the receiving director circuit in Figs. 11 and 12. When relay 123 closes its back contact, relay 127 opens its front contact to disconnect ground from the lead 355.

Receiving director circuit in unattended repeater station

The receiving director circuit, Figs. 11 and 12, in each unattended station consists of a relay counting chain arranged to count the pulses in the first digit of all sending director signals transmitted thereto over the associated composite signaling circuit via channel No. 2. If the first digit originated in the sending director circuit at the attended station does not contain the predetermined number of pulses required for transmitting signals to this unattended station, the receiving director circuit at the latter station ignores all subsequent digits until the dial key 457 in the sending director circuit at the attended station, Fig. 5, has been released and reoperated. If the first digit contains the required number of pulses, then the receiving director circuit at the identified unattended station proceeds to count the pulses in the next two digits and connects ground to one of the one hundred order leads corresponding to these two digits, as will be explained hereinafter; and the order lead so selected remains grounded until the dial key 457 is released.

When the dial key 457 in the sending director circuit, Fig. 5, is operated, ground from lead 355 of the composite signaling circuit in Fig. 13 operates relay 133, Fig. 11, in series with the sending relay connected to lead 356 in the associated composite signaling circuit ground terminal channel No. 2, Fig. 18. The composite signaling circuit ground terminal, Fig. 18, which is the same as Fig. 4 transmits the director signals to more distant stations equipped with receiving director circuits, Figs. 11 and 12. When the receiving director circuit is located in the most distant station from the attended station, terminating resistance 134 and associated battery serve to complete the energization circuit for relay 133 as shown in Fig. 11. This relay operates and thereupon operates relay 135 which in operating operates relay 136 to provide holding ground to various parts of the circuit in Fig. 11. Relay 136 also connects ground to lead 357 to the cable failure alarm sending circuit, Fig. 19, to permit an operation of the latter circuit in the event that the cable is in trouble so as to cause a disabling of channel No. 2 of the composite signaling circuit in the link directly beyond the station to which the director signal is addressed. Each dial pulse from the sending director circuit in Fig. 5 causes a momentary release of relay 133 in Fig. 11. On the first dial pulse, the lower back contact of relay 133 operates relay 137 via lower back contact of relay 149 and inner upper front contact of relay 135. Relay 137 remains operated between dial pulses and releases at the end of the first digit. Relay 137 in operating removes the short circuit from relay 138 permitting the latter relay to operate. The first and subsequent dial pulses of the upper back contact of relay 133 operate a pulse frequency dividing circuit consisting of relays 139, 140, 141 in Fig. 11 and a counting relay chain consisting of relays 142 through 147 in Fig. 12. The path for effecting the operation of these relays may be traced through contact 148 of relay 149, contact 150 of relay 151, and contact 152 of relay 135 and the windings of the pulse dividing relays. The counting chain in advancing transfers the ground lead associated with contact 153 of relay 137 in turn to each of the ten leads connected to relays 149 and 154 in Fig. 12. At the end of the digit, relay 137 releases to connect ground through contact 153 and relay contacts in the counting chain to one of the leads shown by the optional designations 388 through 397 shown in Fig. 12. If the wiring selected for this station is such that the ground from contact 153 of relay 137 does not reach contact 155 of relay 138 at the end of the first digit, the circuit of Fig. 11 ignores subsequent digits. In this event ground from contact 156 of relay 137 through contact 157 of relay 138 operates relay 151 and locks the latter relay to contact 158 of relay 136. Operation of relay 151 opens the pulsing path via its contact 150 to the pulse frequency dividing circuit (relays 139, 140 and 141) so that subsequent pulses fail to reach the counting relays.

In an unattended station in which the optional wiring is arranged so that ground (through the counting chain) reaches contact 155 of relay 138 at the end of the first digit, this ground operates relay 159 on its primary winding. In this event relay 151 operates in its usual manner but contact 160 of relay 159 reestablishes the pulse circuit from the upper back contact of relay 133 to the pulse frequency dividing circuit (relays 139, 140 and 141) so that subsequent pulses can be counted. Relay 159 in operating removes holding ground for the counting chain, relays 142 through 147, thereby effecting the release of the counting chain in preparation for the counting of the next successive digit.

At the beginning of the second digit originated by the dial 89 in Fig. 5, relay 161 operates when relay 137 removes ground from resistance 162. Relay 161 in operating operates relay 154 through contacts of relays 161, 168 and 159 to connect the ten output leads of the counting chain, relays 142 through 147, to the ten relays 163 in Fig. 12. The counting chain functions in the usual manner as the dial pulses of the second digit are received so that at the end of this digit ground from contact 153 of relay 137 in Fig. 11 effective through the counting relays operates one of the ten 163 relays depending on the number of pulses in the second digit. Relay 163 in operating on its winding 164 locks up on its winding 165 through its contact 166 to contact 167 of relay 136 in Fig. 11. The particular relay 163 operated in the manner just mentioned also operates relay 168 which, in operating, locks up to contact 169 of relay 136 and at the same time releases relay 154 to disconnect the windings of the relays 163 from the counting chain in Fig. 11. Relay 154 in releasing removes holding ground from the counting chain in Fig. 12 to prepare this chain for counting the third digit. It should be noted that the operation of one of the relays 163 connects a selected group of ten order leads, designated RD1 through RD10 in Fig. 12, to relay 149.

At the beginning of the third digit, relay 170 in Fig. 12 operates when relay 137 in Fig. 11 operates to remove ground from resistance 171 associated with the former relay. The path from resistance 171 to ground may be traced through upper contacts of relay 170, contact 458 of relay 163, contact 156 of relay 137 and contact 158 of relay 136. Relay 170 in operating provides a new holding ground to the counting chain via its lower inner front contact. As the pulses are received for the third digit, the counting chain functions in the usual manner until the release of relay 137 at the end of the third digit connects ground from its contact 153 to the selected spring on relay 149 in Fig. 12. Contact 156 of relay 137 also connects ground through contact 172 of relay 170 to the winding of relay 149 causing the latter to operate and thereby connect the ground from the counting chain in Fig. 12 to the selected lead connected to relay 163 which is operated, whereby the required lead of the order leads RD1 through RD10 is finally selected. Relay 149 in operating opens the circuits in series with the back contacts of relay 133 in Fig. 11 so that additional manipulation of the dial 89 of the sending director circuit in Fig. 5 will not cause the further operation of relay 137 in Fig. 11 and the pulse counting relays in Fig. 12. Ground remains on the selected order lead RD until the dial key 451 in the sending director circuit in Fig. 5 is released whereupon relay 133 is released to cause all relays in the circuit of Figs. 11 and 12 to return to the normal condition.

*Indication sending circuit in unattended repeater stations*

Figs. 14, 15, 16 and 17 provide a circuit for sending indication signals from an unattended station to an indication receiving circuit in the distant attended station. This circuit operates to control the energization of individual lamps in a bank of lamps in the distant attended station for indicating each of a preselected group of conditions at each unattended station. These conditions are associated with, for example 168 indicator contacts connected to fourteen relays 207 included in Fig. 17. The distant indication receiving circuit located in the attended station, Figs. 6 and 7, contains a neon lamp corresponding to each of the 168 indicator contacts. Each indicator contact is associated with an indication point which will be identified later herein with reference to Fig. 22. When the sending indicator circuit is operated by a signal from the associated receiving director circuit described above in connection with Figs. 11 and 12, ground over lead RD operates relay 173 in Fig. 14 to start a pulse generator circuit consisting of relay 177, condenser 176 and associated resistances 179 and 181 connected to battery and ground, respectively. Pulses from this generator operate relays in two counting relay chains to scan each of the 168 indicator contacts by connecting lead 359 of the composite signaling circuit battery terminal in Fig. 13 to each of the indicator contacts in turn in the unattended station. At the same time the pulse generator circuit transmits a series of ground pulses over lead 360 to the composite signaling circuit to operate a pair of similar counting relay chains in the distant attended station. The two relay chains in the distant attended station scan a group of 168 lamps thereat. Each time lead 359 is connected to a grounded indicator contact in the sending indication circuit, a signal is transmitted over composite signaling circuit channel No. 3 to energize the lamp corresponding to the contact. After all contacts have been scanned, relay 191 is operated momentarily in a local circuit to restore this circuit to normal condition.

Figure 14:
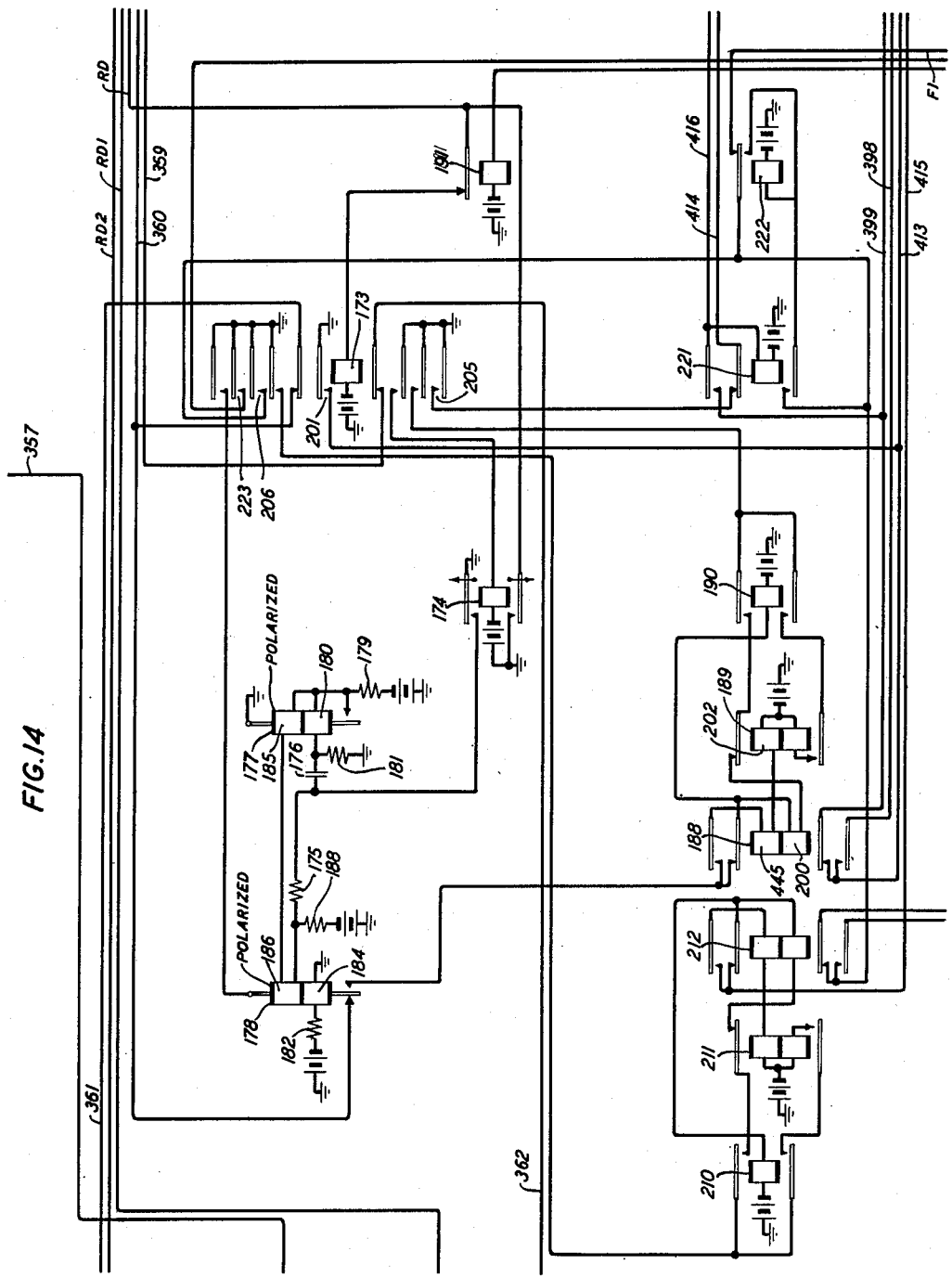
Figure 15:
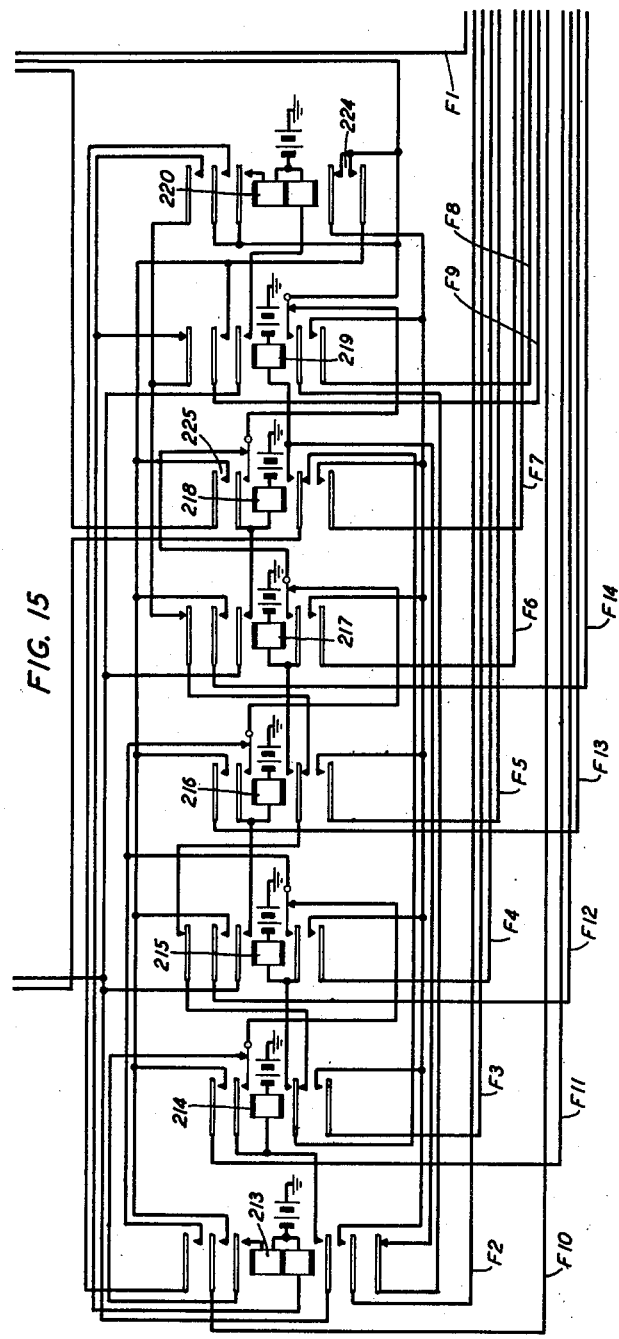

The operation of relay 173 on ground applied to lead RD by the receiving director circuit as just mentioned provides holding ground to the two counting relay chains in Figs. 14 and 15, operates relay 174 to start the pulse generator, applies ground to lead 360 to the composite signaling circuit in Fig. 13 to prepare the distant receiving circuit at the attended station, Figs. 6 and 7, for operation and interrupts leads 361 and 362 to isolate the similar indication sending circuits in unattended stations more distant from the attended station while the same circuit in the unattended station under discussion is in operation. Operation of relay 174 connects ground to the junction point of resistance 175 and condenser 176 to put the pulse generator relay 177 and its follower relay 178 in operation. In the idle condition relay 177 is held off its front contact by the flow of battery current through resistance 179, winding 180 of this relay, and resistance 181. Relay 178 is normally held on its back contact by the flow of battery current through resistance 182, and winding 184 of relay 178. The operation of relay 174 closes a path from battery through resistance 179, winding 185 of relay 177, winding 186 of relay 178, resistance 175 to ground on a front contact of relay 174. This current holds relay 178 on its back contact and tends to operate relay 177. This tendency, however, is overcome by the charging current for condenser 176 which flows through resistance 179 and winding 180 of relay 177. Relay 177, therefore, remains in the released position until condenser 176 is charged to the point where relay 177 is permitted to operate on its winding 185. Relay 177 in operating closes a circuit from battery through resistance 188, winding 186 of relay 178, and winding 185 of relay 177 to ground via front contact of relay 177. The flow of current in the circuit just traced operates relay 178 to remove ground from lead 360 and supplied thereby to the composite signaling circuit in Fig. 13, and to connect ground via its front contact to relay 188 to indicate the beginning of the first pulse to the two counting relay chains at the attended station and the two local counting relay chains in Figs. 14, 15 and 16. The current for operating relay 178 on its winding 186 tends to release relay 177 but this tendency is overcome by the discharge current of condenser 176 through winding 180 of relay 177 so that the release of relay 177 is delayed until the condenser is discharged. When relay 177 releases, relay 178 also releases to restore the normal condition to the circuit whereupon condenser 176 charges and permits relay 177 to operate a second time in the manner aforedescribed. This successive operate and release of relay 177 is repeated approximately ten times per second until a total of 195 pulses has been produced. Relay 178 in following these pulses interrupts lead 360 for each of the foregoing pulses to transmit 195 pulses to the indication receiving circuit at the attended station, Figs. 6 and 7, and closes the lead to relay 188 to cause the two counting relay chains in Figs. 14, 15 and 16 to count the pulses. The 195th pulse is transmitted through the two counting relay chains to operate relay 191 in Fig. 14 to release relay 173 after each operation.

The two groups of counting relays in Figs. 14, 15 and 16 are adapted to count fourteen digits. Each relay group consists of a pulse frequency dividing circuit containing three relays and a re-entrant type of counting chain containing eight relays. The first relay group for counting pulses from the front contact of relay 178 consists of pulse frequency dividing relays 188, 189 and 190 in Fig. 14 and counting relays 192 through 199 in Fig. 16. The beginning of the first pulse from relay 178 via its front contact operates relay 190 which locks up to a ground contact of relay 173. The end of the first pulse removes the short circuit from winding 200 of relay 188 causing the latter relay to operate in series with the winding of relay 190. The operation of relay 188 connects ground from contact 201 on relay 173 over lower front contact of relay 188 to lead 398. The beginning of the second pulse from the front contact of relay 178 operates relay 189 on its winding 202 and holds relay 188 operated on the latter's winding 445. The operation of relay 189 releases relay 190. At the end of the second pulse relays 188 and 189 are released to restore the dividing circuit to its normal condition and to connect ground to lead 399 via lower back contact of relay 188. This operation is repeated for each two pulses from relay 178, and applies ground to lead 398 after each odd-numbered pulse and to lead 399 after each even-numbered pulse. The first pulse over lead 398 operates relay 192, Fig. 16, on its winding 203 in series with contacts on other relays in the same group. Relay 192 in operating locks up on its winding 204 to contact 205 of relay 173. Relay 192 in operating also prepares relay 193 to operate on ground over lead 399 at the end of the second pulse. Relay 193 in operating releases relay 192 and prepares relay 194 for operation on the next pulse of lead 398. Successive pulses over leads 399 and 398 continue to advance the chain until relay 199 operates. Relay 199 in operating does not release relay 198. The ninth pulse operates relay 192 for a second time, releases relay 198 and leaves 199 operated. The chain then continues to advance a second time until relay 197 is reached at the end of the fourteenth pulse.

Closure of contact 206 of relay 173 operates the first relay 207 of a group of fourteen relays 207, Fig. 17, which connects a group of twelve indicator contacts to the leads designated 400 through 411. The operation of the counting relays 192 through 199, as described above, connects lead 359 of the composite signaling circuit in Fig. 13 through lead 412 to each of these twelve leads in turn beginning with lead 400 in Fig. 16. The thirteenth pulse of the above-mentioned fourteen pulses connects ground from contact 201 of relay 173 and lead 413 through contact 208 of relay 199 and contact 209 of relay 196 over lead 415 to relay 212, Fig. 14, to operate the second counting chain. The second counting circuit includes the pulse frequency dividing circuit relays 210, 211 and 212 in Fig. 14 and the reentrant type counting relays 213 through 220 in Fig. 15. The second counting relay chain operates in a manner similar to the first relay counting chain just described and is operated by the thirteenth pulse effective, over lead 415 from the latter counting relay chain each time the first counting relay chain goes through its cycle of operation. The fourteenth pulse from the first counting relay chain in Fig. 16 operates relay 221 in Fig. 14 over lead 416 and locks it to lead 399 so that relay 221 will remain operated until the end of the fourteenth pulse. Relay 221 in operating removes ground from lead 414 to release relays 197 and 199 in the first counting relay chain to prepare this relay chain for counting the next series of fourteen pulses from relay 178. The first operation of relay 221 serves to operate relay 222 via a contact of relay 201; and relay 222 locks up to the same contact to release the first relay 207 to disconnect the first group of indicator contacts, Fig. 17, from the first counting relay chain. The thirteenth pulse of each group from the first counting relay chain in Fig. 16 institutes the operation of the second counting relay chain which controls the second through fourteenth of the group of relays 207 in Fig. 17. The operation of relay 213 on the first cycle of the first counting relay chain in Fig. 16 connects ground from contact 223 of relay 173 via back contact relay of 220 in Fig. 15 to the second relay 207 in Fig. 17 to connect a second group of twelve indicator contacts to the first counting relays 192 through 199 in Fig. 16. The second counting relay chain continues to advance and connect a new relay 207 to the first counting relay chain until the 168 indicator contacts connected to the fourteen 207 relays have been scanned. During this scanning operation each time a grounded indicator contact is encountered, ground is connected to lead 359 in Fig. 13 to send an indicator pulse to the attended station to operate the indicator lamp identified with the indicator contact being scanned. The thirteenth pulse on the fourteenth cycle of operation of the first counting relay chain operates relay 218 in Fig. 15 a second time to connect ground from contact 223 of relay 173 in Fig. 14 through contact 224 of relay 220 and contact 225 of relay 218 to the winding of relay 191 in Fig. 14. The latter relay operates to release relay 173 in Fig. 14 and thereby to restore the circuit of Figs. 14, 15, 16 and 17 to its idle condition but allows indicator lamps to remain energized in the indication receiving circuit at the attended station, Figs. 6 and 7, which will be described hereinafter.

If synchronizing signal and indication pulses are being sent from an unattended station more remote from the attended station than the one shown in Fig. 18, such pulses are received from such more unattended station at this ground terminal over leads 381 and 382. From this circuit the pulses are passed over leads 368 and 369 to the cable failure alarm sending circuit in Fig. 19, through Fig. 19 to the indication sending circuit shown in Figs. 14, 15, 16 and 17, and thence to the composite signaling circuit battery terminal in the same unattended station, where they are retransmitted toward the attended station as will be described later herein. Thus the pulses are reformed and repeated at each unattended station along the route to the attended station until they are received thereat.

*Composite signaling circuit battery terminals for channels Nos. 2 and 3*

Fig. 13 shows the composite signaling circuit battery terminal in each unattended station for channels Nos. 2 and 3 as shown in Fig. 2. Channel No. 2 is used for the transmission of order signals from the sending director circuit in the attended station, Fig. 5, and the transmission of indication synchronizing signals from the unattended stations to the attended station. A series of pulses sent from the attended station by dial 89 in Fig. 5 selects the particular unattended station to which an order is directed and transmits the order thereto. The pulses sent back from the called unattended station serve to synchronize the indication receiving circuit in the attended station, Figs. 6 and 7, with the indication signals sent back from the called unattended station. Synchronizing pulses on lead 360 in Fig. 14, operate relay 226, Fig. 13, which connects ground to the apex circuit of windings 128 and 129 of relay 123. The operation of the circuit of Fig. 13 is similar to that of the corresponding battery terminals of the composite signaling circuit of channel No. 1 described hereinbefore. The synchronizing pulses are sent over lead 354 to the composite signaling circuit ground terminal for the attended station as shown in Figs. 2 and 4.

Channel No. 3 is a one-way circuit operative only in the direction from the unattended stations toward the attended station, and is utilized exclusively for the transmission of the indication signals from each unattended station to the attended station, Fig. 2. For this purpose a steady pulse of unit length or a multiple of the unit length is sent from the unattended station originating the signals, and is chopped up at the first ground terminal encountered into a series of pulses having half the length of the original unit pulse. In Fig. 13 battery is connected to the line lead 363 through the back contact of relay 228, noise killer inductance 229 and resistance 230 when the circuit is in the idle condition. When ground is connected to the 359 lead in a manner hereinbefore described, relay 228 operates to remove battery from its back contact and to connect ground via its front contact to line lead 363. This lead terminates through a winding of relay 231 in Fig. 4 in a voltage divider at its distant end of the line so that the reversals of battery and ground produce equal and opposite currents on the line 363.

*Composite signaling circuit ground terminal channels 2 and 3*

The composite signaling circuit for channels Nos. 2 and 3 in Figs. 2, 4 and 13 is similar to the composite signaling circuit for channel No. 1 described hereinbefore in connection with Figs. 2, 20 and 10 except for relays 113 and 114 in series with winding 116 of relay 115 in Fig. 4. Channels Nos. 2 and 3 are interlocked by means of relays 113 and 114 so that when the scanning circuit explained above, which transmits synchronizing pulses over channel No. 2, encounters at an indication point a grounded lead which sends a ground signal over channel No. 3, the synchronizing and indication signals via these two channels will appear simultaneously at the attended station. This insures that the proper indication signal is applied to the corresponding indication lamp. In general, relay 114 cannot operate and follow pulses over channel No. 2, as relay 113 does, unless an indication signal is being received over channel No. 3. A signal over channel No. 3 releases relay 231 which thereupon removes the locking circuit from relay 114 so that the latter may follow the pulses over channel No. 2. Synchronizing pulses from the circuit of Fig. 13 are received over lead 354 and indication signals are received over lead 363.

In Fig. 4 it will be noted that one winding of relay 113 and one winding of relay 114 are in series with winding 116 of relay 115. With ground connected through the front contact of relay 115, current through the winding of relay 113 holds the latter on its back contact. Current through winding 118 of relay 114 is in a direction to operate the latter to its front contact but current through its winding 120 holds relay 114 on its back contact. When relay 115 transfers ground from its front contact to its back contact, current through winding 118 of relay 114 and the winding of relay 113 is reversed causing relay 113 to operate to its front contact but holding relay 114 on its back contact. When relay 113 operates, synchronizing pulses are sent over lead 364 to the indication receiving circuit in the attended station, Figs. 2, 6 and 7.

When synchronizing and signaling pulses are received simultaneously over leads 354 and 363 respectively, relays 115 and 231 are operated. In this case both windings of relay 114 are energized in the direction tending to operate the relay so that relay 114 operates to connect ground to lead 365 to send a signaling pulse to the indication receiving circuit in Figs. 2, 6 and 7.

The indication receiving circuit is a circuit which receives only signals from the composite signaling circuit, ground terminal, Fig. 4. Ground applied via lead 363 to the circuit of Fig. 4 at an unattended station causes relay 231 to operate or release. While relay 231 is released, battery through resistance 232, contact of relay 231, winding 120 of relay 114, contact 233 of relay 234 and back contact of 114 to ground, holds relay 114 on its back contact regardless of the direction of current through its winding 118. When relay 231 operates, relay 114 will be operated by current through its winding 118 as controlled by relay 115. The direction of current through winding 118 of relay 114 is in a direction opposite to the current through winding 117 of relay 113 so that the front contact of relay 114 will be closed when relay 115 is operated to its front contact. When relay 115 is operated to its back contact, the current through winding 118 of relay 114 holds relay 114 on its back contact. This closes the operating circuit for relay 234, whereby this relay is held in the operated condition. If the locking winding circuit of relay 114 is closed at this time and remains closed, relay 114 cannot operate to its front contact. Relay 234 is slow release and is held operated while relay 114 is intermittently operated by pulses from relay 115. However, if indication signals are being received on lead 363 as above mentioned and relay 231 is operated, relay 114 operates to open its back contact and close its front contact. When the front contact of relay 231 is again closed, relay 114 is not released until relay 115 reoperates at the end of the synchronizing pulse. If relay 115 remains in the released position for a longer interval than is normally required to receive one pulse, relay 234 releases to connect ground to winding 120 of relay 114 to permit relay 231 to reestablish control over relay 114. As soon as relay 114 closes its back contact, relay 234 is reoperated. When relay 114 is operated ground is sent over lead 365 to the indication receiving circuit in the attended station as shown in Figs. 2, 6 and 7.

*Indication receiving circuit in attended repeater station*

The indication receiving circuit as shown in Figs. 2, 6 and 7 in the attended station operates in response to signals received over channels Nos. 2 and 3 of the composite signaling circuit. These signals originate in an indication sending circuit located in one of the distant unattended stations, and as above pointed out, comprise (1) synchronizing signals sent over channel No. 2 and lead 354 and ultimately rendered effective over lead 364, and (2) indication signals sent over channel No. 3 and lead 363 and ultimately rendered effective over lead 365. The synchronizing signals sent over channel No. 2 serve to operate two chains of counting relays, Fig. 6, in such manner that relay 235, Fig. 6, operated under control of channel No. 3, is connected in turn to each of the 168 indicator lamps 276, Fig. 7. The operation is such that an indication signal received over channel No. 3 and via relay 114, Fig. 4, causes the operation of relay 235 to energize an indicator lamp each time the scanning circuit in one of the distant unattended stations encounters a grounded indicator contact as above-mentioned in connection with Figs. 14, 15, 16 and 17. In each of the latter stations an indicator contact is provided for each of the 168 indicator lamps 276 in Fig. 7. After the completion of one full cycle of operation, the lamp bank in Fig. 7 is left with one energized lamp to correspond to each grounded indicator contact in the distant unattended station.

The operation of relay 236 in Fig. 6 on a signal via relay 114, Fig. 4, from the indication sending circuit in one of the distant unattended stations as above-mentioned, serves to operate relay 237, Fig. 6. The latter relay in operating removes ground from lead 352 connected to the sending director circuit in the attended station, Fig. 5, to disable the latter circuit and thereby to prevent signals tending to outgo therefrom over channel No. 2 of the composite signaling circuit in Fig. 2, from interfering with the synchronizing pulses being received at the attended station via channel No. 2 and required to operate relay 236 as previously explained. Relay 237 also operates relay 238 in a local circuit, Fig. 6, to provide a holding ground for the two counting relay chains in Fig. 6. Each time relay 236 is released in response to a pulse from a distant unattended station, this relay supplies ground through contact 239 of relay 237 to the pulse frequency dividing circuit consisting of relays 240, 241 and 242. Figs. 6 and 7 contain two counting relay chains each comprising a pulse frequency dividing circuit and a reentrant counting chain capable of counting fourteen pulses. The first counting circuit in Fig. 6 includes the previously mentioned pulse frequency dividing circuit comprising relays 240, 241 and 242, and a reentrant counting chain consisting of relays 243 through 250. The second counting circuit includes a pulse frequency dividing circuit comprising relays 251, 252 and 253 in Fig. 6, and a reentrant counting chain comprising relays 254 through 261 in Fig. 7. The first counting circuit counts the individual pulses from relay 236, and the second counting circuit advances one step each time the first counting circuit goes through one full cycle of its operation. The closure of ground through the back contact of relay 236 at the beginning of the first pulse operates relay 242 which locks up to a contact of relay 238. Removal of ground from the back contact of relay 236 at the end of the first pulse permits relay 240 to operate on its winding 262 in series with the locking circuit for relay 242. The application of ground via the back contact of relay 236 at the beginning of the second pulse energizes winding 263 of relay 240 and winding 264 of relay 241 in series. This operates relay 241 and holds relay 240 operated. Relay 241 in operating releases relay 242. Removal of the ground from the back contact of relay 236 at the end of the second pulse releases both relays 240 and 241 to restore the circuit of Fig. 6 to its normal condition. Each two successive pulses cause the relay operation just described.

From the foregoing operation, it will be noted that ground from contact 265 of relay 238 is connected to contact 268 of relay 240 at the conclusion of the transmission of each odd-numbered pulse and to contact 267 of relay 240 after each even-numbered pulse. Ground on contact 268 and via the contacts of other relays in Fig. 6, on the completion of the first pulse, operates relay 243 which locks up on its winding 270 and contacts of other relays in Fig. 6 to contact 271 of relay 238 and which thereupon prepares relay 244 for operation on the next pulse appearing on contact 267 of relay 240. Ground on the latter contact at the end of the second pulse operates relay 244 through contact 272 of relay 243. The operation of relay 244 releases relay 243 and prepares relay 245 for operation on the next succeeding ground from contact 268 of relay 240. In a similar manner successive pulses from the contacts 267 and 268 of relay 240 cause the counting chain to advance to include relay 249 until the eighth pulse is reached. This pulse operates relay 250 and prepares relay 243 for operation a second time but does not release relay 249. The ninth pulse operates relay 243, releases relay 249, and prepares relay 244 for its second operation. The counting chain then advances a second time until the fourteenth pulse causes the operation of relay 248, with relay 250 still operated. The operation of relay 238 connects ground through its contact 273, back contact of relay 274 and lead F1 to the winding of the first relay 275 in Fig. 7. The operation of relay 275 connects twelve lamps 276 to the twelve leads designated 417 to 428 to the counting chain in Fig. 6.

With relay 243 in Fig. 6 operated in response to the first pulse as previously mentioned, ground via the back contact of relay 235, Fig. 6, is connected through contact 277 of relay 250, contact 278 of relay 243, and contact 279 of the first relay 275 to the first lamp 276 in Fig. 7. Now the operation of relay 235 in response to a signal received over channel No. 3 of the composite signaling circuit as hereinbefore explained, will connect battery through resistance 280 and the front contact of relay 235 to energize the first indicator lamp 276 in Fig. 7 when and if such signal is received before the end of the second pulse utilized for operating the counting chain as just described. Each successive pulse advances the counting chain in Fig. 6 and connects the armature of relay 235 to a different indicator lamp 276 in Fig. 7 until the twelfth lamp in the first group of twelve indicator lamps is reached. The thirteenth pulse counted by the counting relays in Fig. 6 connects ground from contact 265 of relay 238 through contact 281 of relay 250 and contact 282 of relay 241 to the pulse frequency dividing circuit associated with the second counting chain as previously identified. This pulse operates the second pulse frequency dividing circuit to advance the second counting chain in Fig. 7. The fourteenth pulse from the first counting chain in Fig. 6 connects ground to the winding of relay 283 causing this relay to operate and lock up to contact 267 of relay 240 until the end of the fourteenth pulse. Relay 283 in operating removes holding ground from the first counting chain to release relays 248 and 250 to prepare the counting chain in Fig. 6 for a second cycle of operation. The first operation of relay 283 operates relay 274 and causes the latter relay to lock up to contact 273 of relay 238 until the entire circuit has completed its operation. Relay 274 in operating releases the first relay 275 in Fig. 7 to disconnect the first group of twelve indicator lamps 276 from the counting relays in Fig. 6. The advance of the second counting chain to its first position operates the second relay 275 in Fig. 7 to connect a second group of indicator lamps 276 to the first counting chain. Each time the first counting chain goes through a complete cycle of operation the second counting chain advances one step to connect a new group of indicator lamps to the first counting chain till all fourteen 275 relays in Fig. 7 have been operated and the armature of relay 235 has been connected in turn to each of the 168 lamps 276 in Fig. 7. After the 195th pulse has been received, the indication sending circuit in the distant unattended station, Fig. 2, removes ground from channel No. 2 of the composite signaling circuit, Fig. 2, so that relays 236, 237 and 238 are released to restore the circuit in Fig. 6 to its normal condition. For the purpose of making whatever record may be required, the neon lamps 276 in Fig. 7 remain energized until key 276a is manually operated momentarily to remove plate battery from these lamps and thereby to deenergize them.

As shown in Fig. 2, the 168 lamps 276 (Fig. 7) are arranged in a bank directly underneath a translucent glass plate 500 on top of which may be positioned a transparent sheet 501. The lamp bank comprises fourteen rows of twelve lamps in each row. This sheet is so arranged in squares that one square is associated with each lamp as illustrated in Fig. 22. From the latter figure it will be noticed that ten lamps are used to check the synchronization of the system. In this connection, the first five and the last five of the 168 indication signals are utilized. When the proper lamps are energized or non-energized as indicated by the corresponding squares of the sheet 501, this will serve as a positive indication that each of the remaining 158 lamps is connected to the proper indication point at the particular unattended station to which the attended station is then connected. In the event that the ten indication lamps fail to be energized or non-energized in the sequence indicated on sheet 501, this will serve as an indication that the lamps at the attended station are not connected to the proper indication points at the particular unattended station to which the attended station is then connected.

Referring to Fig. 22, major alarms are enclosed in heavy solid lines; minor alarms are enclosed in medium weight double lines; and "indications" are enclosed by a single solid line. The sheet includes the following data:

| Row | Designation | Explanatory Detail |
|---|---|---|
| 1 | Synchronization—Start | Synchronization check. |
|   | CA Fail Send Ckt | Cable failure sending circuit. |
|   | Chan. 1—Sect | Channel 1—sectionalized. |
|   | Chan. 2—Fail | Channel 2—failure. |
|   | Chan. 3—Fail | Channel 3—failure. |
|   | Station Identification | Identifies sending station as follows: Station 1=Lamp 1, Station 6=Lamp 1+5, Station 2=Lamp 2, Station 7=Lamp 2+5, Station 3=Lamp 1+2, Station 8=Lamp 1+2+5, Station 4=Lamp 4, Station 9=Lamp 4+5, Station 5=Lamp 5, Station 10=Lamp 1+4+5 |
| 2 | Synchronization—Stop | Synchronization check. |
|   | Fuel Gas Low | Gas engine fuel supply low. |
|   | Temp. High-Low | Room temperature too high or too low. |
|   | Fire | Fire alarm. |
|   | Door Open | Door open alarm. |
|   | LOC Cut Thru | Local order circuit cut through. |
|   | COC Cut Thru | Cableman's talking circuit cut through. |
|   | PA LOC Clear | Pilot alarm location circuit clear. |
| 3 | Fuses—Disch | Main discharge fuse failure. |
|   | Fuses—Dist | Main distributing fuse failure. |
|   | 24-Volts—H-L Volt | 24 v. battery voltage too high or too low. |
|   | 24-Volts—Reg. Fail | 24 v. battery charging regulator failure. |
|   | ABS—24 v., 130 v | Alarm battery supply fuse failure—24 v., 130 v. |
|   | ABS—48 v | Alarm battery supply fuse failure—48 v. |
|   | 130 Volts | 130 Volt Battery. |
|   | Gen. Fuse Fail | Charging generator discharge fuse failure. |
|   | Gen. Fail | Charging generator failure. |
|   | Pos. Float | Positive battery voltage too high or too low while charging. |
|   | Pos. H-L Load | Positive battery voltage too high or too low across load. |
|   | Neg. Float | Negative battery voltage too high or too low while charging. |
|   | Neg. H-L Load | Negative battery voltage too high or too low across load. |
| 4 | Power Control Panel Failure | Power loop failure. |
|   | 201-202W | L units 201 and 202 West. |
|   | 203-204W | L units 203 and 204 West. |
|   | 205-206W | L units 205 and 206 West. |
|   | 207-208W | L units 207 and 208 West. |
|   | 201-202E | L units 201 and 202 East. |
|   | 203-204E | L units 203 and 204 East. |
|   | 205-206E | L units 205 and 206 East. |
|   | 207-208E | L units 207 and 208 East. |
|   | Com'l A. C. Pwr.—Fail | Commercial A. C. Power—Failure. |
|   | Com'l A. C. Pwr.—Restore | Commercial A. C. Power—Restored. |
|   | Gas Eng.—Fail | Gas Engine—Failure. |
|   | Gas Eng.—Oper | Gas Engine—Operating. |
| 5 | Alt. Cont. Bay—No Volt. Out | Alternator control bay—no voltage output. |
|   | 201-202, 203-204, etc | L units 201 and 202, 203 and 204, etc. |
|   | No Volt.—Trans. to Mot. Alt | No voltage—transferred to motor alternator. |
|   | 201-202, 203-204, etc | L units 201 and 202, 203 and 204, etc. |
|   | Motor Alternator Fail | Motor alternator failure. |
|   | No. 1, No. 2, etc | Machine No. 1, Machine No. 2, etc. |
|   | Rect. Fail—24/130 v | Rectifier failure—24 v. or 130 v. |
|   | 48 v. H-L Volt | 48 v. battery voltage too high or too low. |
|   | Rectifier—Inverter Failure | Rectifier—inverter failure. |
|   | No. 1, No. 2, etc | Rectifier—inverter failure No. 1, No. 2, etc. |
| 6 | Rect.—Invert. Oper | Rectifier—inverter operating. |
|   | Mot. Alt. A. C. Mot. Fail | Motor alternator A. C. motor failure. |
|   | Mot. Alt. Emg. Fail | Motor alternator emergency machine failure. |
|   | Power Trs. to Mot. Alt | Power transferred to motor alternator. |
|   | Alt. Cont. Fuse Alarm | Motor alternator control fuse failure. |
|   | 64 kc. Pilot Alarm at Non-Sw. Main | 64 kc. pilot alarm outside limits at non-switching main station. |
| 7 | 201, 202, 203, etc | L units 201, 202, 203, etc. |
|   | 3096 (Wkg. Line) Pilot at Sw. Main | 3096 kc. pilot (associated with working line at switching main station) outside limits. |
|   | 201-203, 205-207, etc | L units 201 and 203, 205 and 207, etc. |
|   | 2064 kc. Pilot Alarm at Non-Sw. Main | 2064 kc. pilot alarm outside limits at non-switching main station. |
| 8 | 201, 202, 203, etc | L units 201, 202, 203, etc. |
|   | 3096 (Sp. Line) Pilot at St. Main | 3096 kc. pilot (associated with spare line at switching main station) outside limits. |
|   | 201-203, 205-207, etc | L units 201 and 203, 205 and 207, etc. |

| Row | Designation | Explanatory Detail |
|---|---|---|
| | (3096 kc. Pilot Alarm at Non-Sw. Main | 3096 kc. pilot alarm outside limits at non-switching main station. |
| 9 | 201, 202, 203, etc. | L-units 201, 202, 203, etc. |
| | Sp. Line Fail at Sw. Main | Spare line failure at switching main station. |
| | 201-203, 205-207, etc. | L units 201 and 203, 205 and 207, etc. |
| | Tot. Line Fail at Sw. Main | Total line failure at switching main station. |
| | 201-203, 205-207, etc. | L units 201 and 203, 205 and 207, etc. |
| | Auto. Switch at Sw. Main | Line switched at switching main station. |
| 10 | 201-203, 205-207, etc. | L units 201 and 203, 205 and 207, etc. |
| | Auto Sw. Locked at Sw. Main | Line locked at switching main station. |
| | 201-203, 205-207, etc. | L units 201 and 203, 205 and 207, etc. |
| | Working Line at Switching Main | Indicates which L unit is working line at switching main station. |
| 11 | 201, 202, 203, etc. | L units 201, 202, 203, etc. |
| | Pilot Alarm at Aux. Station | Pilot alarm operated at auxiliary station. |
| | 201-202W | L units 201 and 202 West. |
| | 203-204W | L units 203 and 204 West. |
| | 205-206W | L units 205 and 206 West. |
| 12 | 207-208W | L units 207 and 208 West. |
| | 201-202E | L units 201 and 202 East. |
| | 203-204E | L units 203 and 204 East. |
| | 205-206E | L units 205 and 206 East. |
| | 207-208E | L units 207 and 208 East. |
| | Carrier Supply: | |
| | SG Fail | L supergroup carrier supply failure. |
| | Group Fail | L group carrier supply failure. |
| 13 | Gen. Trans | L carrier supply generator transfer. |
| | 4 kc. End Alm | Indicates adjustment needed in carrier supply synchronizing circuit. |
| 14 | Unassigned | Blank squares are unassigned. |

In use a copy of the data sheet 501 is placed on top of the translucent screen 500 and a check mark or other suitable designation is made on the data sheet for each illuminated lamp. This provides a permanent record of operating conditions at each unattended station for a desired time interval. Thus, possible fault conditions may be anticipated and correction therefore provided before the fault actually occurs; and faults whose occurrence may not be prevented are anticipated to the extent that correction therefore may be provided to reduce the duration of the faults. This tends to enable both a reduction, and possibly the elimination, of certain faults. As a consequence, the occurrence and time duration of faults may be reduced to the irreducible minimum.

*Cable failure alarm sending circuit in unattended repeater stations*

Fig. 19 shows a cable failure alarm sending circuit and includes normally operated slow-releasing relays held so by the ground on leads 366 and 367 of the associated composite signaling circuit shown in Fig. 18. The relays in Fig. 19 remain operated under all normal conditions involved in the transmission of all director signals through the composite signaling system as hereinbefore explained. The composite signaling system is so arranged that under normal conditions battery current is transmitted over the signaling system from the distant unattended stations toward the attended station. An interruption of this current by failure of one of the cable conductors releases the normally operated relay in the circuit of Fig. 19 to provide alarm and indicator signals and to open channels Nos. 2 and 3 so that the indicator system described above will continue to function at all unattended stations positioned between the attended station and the location of the fault in the cable. No automatic alarm system is provided in the circuit of Fig. 19 to indicate a fault involving channel No. 1 of the composite signaling system as faults on this channel are detected at the attended station in a manner to be explained later herein. The location of such faults can then be determined by transmitting signals over the sending director circuit, Figs. 2 and 5, to the unattached stations equipped with the receiving director circuit to cut off channel No. 1 at each thereof to find by trial and error the most distant unattended station which is in full operating condition, on the side of the cable fault nearest to the attended station.

Lead 343 from the composite signaling circuit channel No. 1 is connected to a back contact of relay 284 which is normally released and which connects lead 343 to lead 344 extending to the associated alarm sending circuit in Fig. 10 whereby signals from the more distant unattended stations are permitted to pass through the nearer unattended stations and on to the attended station. Relay 284 serves to interrupt this signaling channel in case a fault in a more distant station tends to disable the entire station alarm system. Relay 284 may be operated by a director signal which applies ground to lead RD2, and in operating locks up through resistance 285 and its contact 286. Relay 284 in operating, also transfers lead 343 from lead 344 to alarm lamp 287. This lamp permits visual observation of line conditions as an aid in determining the nature of the fault occurring in the cable. Relay 284 also grounds lead ID1 to mark an indicator contact to control a lamp 276 in the indication receiving circuit in the attended station. Relay 284 also operates, via a lower front contact, the station alarm cut-off lamp 288. After the fault has been cleared, relay 284 may be released either by a manual operation of station alarm release key 289 in Fig. 19 or by an operation of the sending director system to apply ground to lead RD1, as described above in connection with Figs. 11 and 12.

The signaling circuit of channel No. 2 from more distant stations passes over lead 368, contact 291 of relay 290, and lead 361, to the indication sending circuit in each unattended station as previously described above regarding Figs. 14, 15, 16 and 17. Relay 292 is held operated by ground over lead 366. Normal operation of the indication sending circuits in unattended stations more distant with reference to the attended station, Fig. 2, does not cause ground to be removed from lead 366 for more than .33 second in any single break so that under normal conditions slow-release relay 290 remains unoperated. Interruption of the composite signaling system between this station and a more distant station equipped with a cable failure alarm sending circuit may cause removal of ground from lead 366. In this case relay 292 is released and relays 290 and 293 operate in obvious local circuits in Fig. 19. Relay 290 in operating transfers lead 368 of the composite signaling circuit from the indication sending circuit to alarm lamp 294. This action prevents the ground on lead 368 from interfering with operation of the indicator system between this station and the station equipped with the indication receiving circuit, Figs. 2, 6 and 7. The operation of relay 290 in Fig. 19 grounds lead ID2 through its contact 295 to mark an indicator at the attended station to indicate that channel No. 2 is in trouble. Relay 290 also releases the normally operated relay 296 to complete a circuit through contact 297 of relay 290 and contact 298 of relay 296 to lead 247 in Fig. 9 to operate the station alarm system described previously hereinbefore. In operating, the station alarm system sends ground back on lead 370 and through contact 299 of relay 290 to the audible or visual alarm circuit. When the fault trouble condition affecting channel No. 2 has been corrected, the circuit of Fig. 19 restores itself automatically to the normal condition. Permanent ground is again applied to lead 366 to operate relay 292 which in turn releases relay 293 connects the winding of relay 293 to lead 357 of the receiving director circuit whenever the circuit of Fig. 19 is operated to indicate a trouble condition on channel No. 2. This connection is so arranged that the operation of the receiving director system will not cause a false release of this alarm circuit under certain cable trouble conditions. Such false release would remove ground from lead ID2 and thereby prevent the indicator system from reporting the location of the trouble. It may be noted that a trouble condition on channel No. 2 at a point located a distance from the attended station equipped with the cable failure alarm receiving circuit, Fig. 8, may cause a momentary operation of relays 290 and 293 in all stations intervening between such distant unattended station and the attended station. In this case only the relays in the unattended station nearest to the fault in the cable will remain operated and the operation of transferring lead 368 at this unattended station to the alarm lamp 294 as abovementioned permits the corresponding alarm relays at all other unattended stations to assume the normal condition.

The alarm system associated with channel No. 3 of the composite signaling system operates in a manner somewhat similar to that associated with channel No. 2. Relay 301 in Fig. 19 holds operated through all normal indicator signals transmitted over channel No. 3. The longest normal break in lead 367 is approximately .06 second. Relay 301 in releasing as a result of an interruption of lead 367 due to a fault on the cable, operates relay 302 which grounds lead ID3 to mark an indicator point to indicate that channel No. 3 is in trouble, to transfer lead 369 to operate alarm lamp 304, and to release relay 303 to operate the station alarm system over lead 347. Restoration of ground to lead 367 returns this portion of the circuit of Fig. 19 to its normal condition.

The lamps 287, 294 and 304 are connected to the audible and visual alarm circuit which is arranged so that it may be disabled at times when not required in particular unattended stations.

*Cable failure alarm receiving circuit in attended repeater station*

Figure 8:
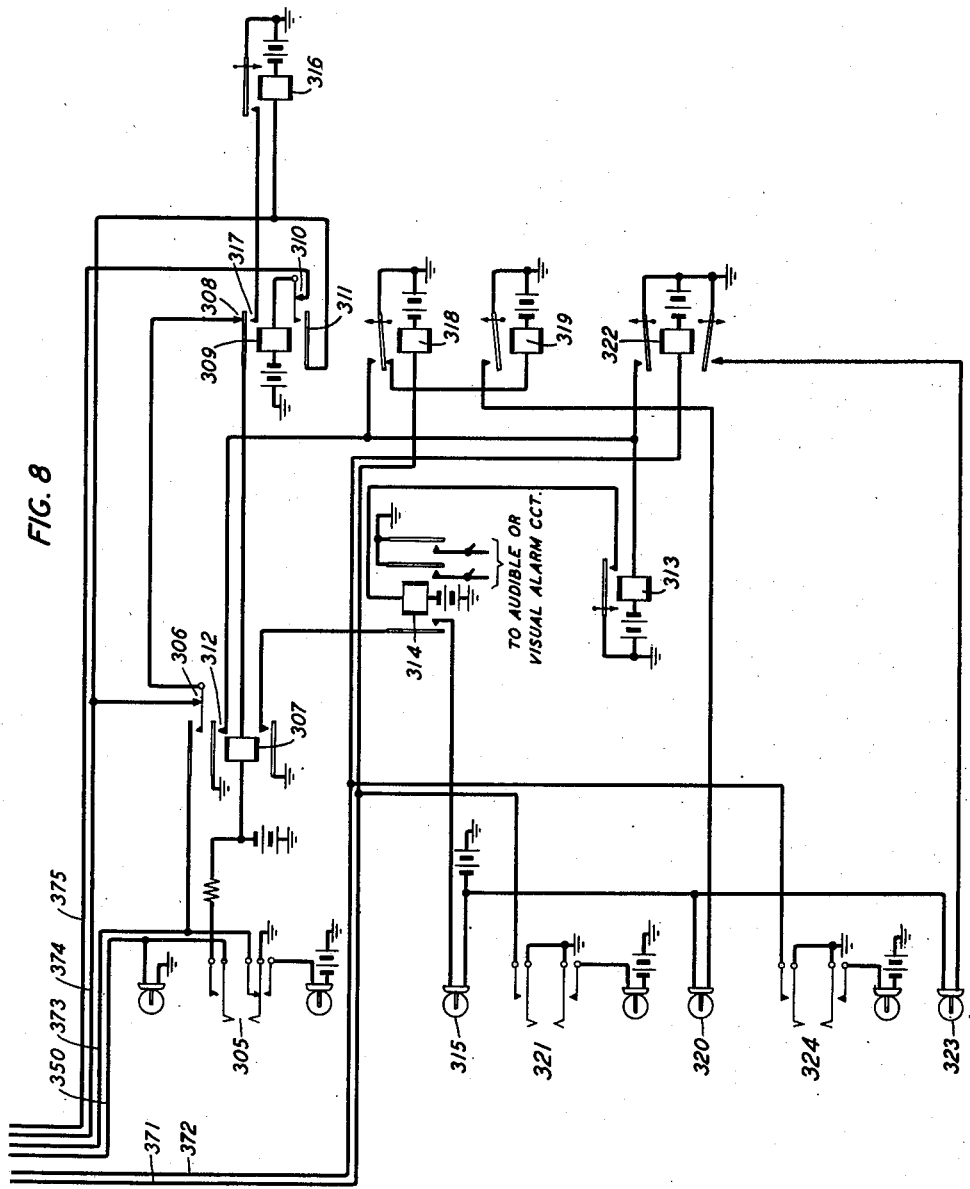
Fig. 8 is a schematic circuit diagram of the attended repeater station of Figs. 1 and 2 showing a cable failure alarm receiving circuit in accordance with the specific embodiment of the invention.

Fig. 8 shows the cable failure alarm receiving circuit which indicates a trouble condition on each of the three composite signaling channels Nos. 1, 2, and 3 associated with the alarm and control system. Each time a signal is received over one of the three channels, ground from leads 350, 371 or 372 is interrupted. These leads are used by the circuit of Fig. 8 to indicate the condition of the three channels. In the case of channels Nos. 2 and 3, removal of ground from the corresponding leads 371 and 372 for an abnormally long period is taken as an indication of trouble. In the case of channel No. 1, the normal incoming signals are rather complex and not easily recognizable by means of a simple relay circuit connected to lead 350. Therefore, the alarm system used to indicate trouble in channel No. 1 operates on signals from leads 373, 374 and 375 from the station alarm receiving circuit, Fig. 3, in a manner which will now be explained.

In the normal operation of the station alarm receiving circuit, Fig. 3, each alarm signal is received by seizure of channel No. 1 followed by a series of three or more pulses whereas any seizure of this channel not followed by a series of pulses is taken as an indication of trouble on channel No. 1. Each time the station alarm receiving circuit is seized for transmission in response to a station alarm signal, the station alarm receiving circuit in Fig. 3 connects lead 373 to lead 374. This completes a circuit from ground through key 305, in Fig. 8, leads 373 and 374 and the station alarm receiving circuit, contact 306 of relay 307, and contact 308 of relay 309 to the winding of relay 307. Relay 307 therefore operates each time the station alarm circuit operates. With normal operation of the station alarm circuit as above noted, the reception of the second pulse from a distant unattended station connects lead 374 to lead 375 to operate relay 309 through its contact 310. Relay 309 in operating locks up to lead 374 through its contact 311 and releases relay 307. Relay 309 then remains operated as long as the station alarm receiving circuit in Fig. 3 is receiving pulses.

As regards the seizure of channel No. 1, if it is caused by a false signal due to cable trouble, no pulses are received so that relay 309 does not operate and relay 307 remains operated. When and if relay 307 remains operated for approximately two seconds, ground from its contact 312 operates slow-operating relay 313 which operates relay 314 in an obvious local circuit. Relay 314 operates alarm lamp 315 to indicate trouble associated with channel No. 1 and at the same time connects ground to the audible or visual alarm circuits. Because of the tendency for vibrating relays to produce pulses under abnormal line conditions, relay 316 has been provided. A long series of pulses would operate relay 307, then operate relay 309 and release 307 as in the operation of a legitimate alarm signal. However, ground would remain on lead 374 as long as pulses continue to arrive on channel No. 1. Since the longest series of pulses due to a legitimate signal would last not more than 2½ seconds, this type of fault can be detected by providing relay 316 having an operate time much longer than that of the longest possible legitimate signal. In case pulses continue to arrive after approximately thirty seconds, relay 316 operates to connect ground through contact 317 of relay 309 to the winding of relay 307. This reoperates relay 307 and then operates relay 313 and relay 314 to provide the audible and visual alarm signals. Key 305 is provided to silence the audible alarm signals and terminate lead 350 in a lamp so that the trouble condition on channel No. 1 may be investigated.

As regards the occurrence of a fault on channel No. 2, relay 318 is normally held operated by ground on lead 371. Since the longest normal interruption of this lead on a normal indicator signal is approximately ⅓ second, relay 318 remains operated under normal conditions. Cable trouble associated with channel No. 2 in the link adjacent to this station might cause permanent removal of ground from lead 371. Removal of this ground would release relay 318 which in turn would release normally operated relay 319 to energize alarm lamp 320. Key 321 permits operation of relay 318 in a local circuit to release relays 313 and 314 to silence the audible alarm. Relay 322 is held normally operated by ground on lead 372. Since the longest interruption of ground on lead 372 due to the reception of indicator signals is approximately .06 second, this relay remains operated under all normal conditions.

The occurrence of a fault on channel No. 3 in the section adjacent to the attended station may cause removal of ground from lead 372 whereupon relay 322 is released to energize alarm lamp 323 and to operate relays 313 and 314 in succession to produce an audible signal. Key 324 is provided to reoperate relay 322 in a local circuit in Fig. 8 to silence the audible alarm until the trouble conditions can be corrected.

*Operation of channel No. 4*

Channel No. 4 constitutes a neutralizing circuit which is common for the three signaling channels Nos. 1, 2 and 3, and which permits the operation of these channels under conditions involving the presence of a relatively large amount of alternating current or direct current ground potential. During idle periods current will flow in each of channels Nos. 1, 2 and 3 and possess a magnitude dependent on the length of the respective channels. In the composite signaling circuit battery terminal shown in Figs. 2, 10 and 13, channel No. 4 includes in Fig. 10 lead 376, and winding 45 of relay 36, lead 376 in Figs. 10 and 13, and in Fig. 13 winding 325 of relay 123, one-half of resistance 326 and the junction between resistances 327 and 328 which form a potentiometer between battery and ground. A balancing circuit for the neutralizing circuit comprises in Fig. 13 the junction between resistances 327 and 328, the other half of resistance 326, winding 329 of relay 123, and lead 377, and in Fig. 10 lead 377, winding 44 of relay 36, balancing network to the junction between resistances 330 and 331 which form a potentiometer between battery and ground. Longitudinal line currents induced or set up by ground potentials have opposite magnetic effects in 43 and 45 windings of relay 36, and in 128 and 325 windings of relay 123; and these effects tend to cancel each other in the respective relays except for predetermined variations in circuit constants.

Outgoing signals sent into the apex circuit of relay 36 in Fig. 10 (junction of its windings 42 and 43) and of relay 123 in Fig. 13 (junction of its windings 128 and 129) produce substantially no change in the magnetic effects of the associated windings of the respective relays if the balancing network connected to each relay balances the line. Incoming signals to the relays 36 and 123 produce a change in the magnetic effects of the above-mentioned associated pairs of windings thereof, which induces a current in winding 45 of relay 36 and/or in winding 325 of relay 123. This induced current in each winding of the respective relays would tend to cause interference when it flows through the winding of the other relay if it were not opposed by the current induced therein. With a good magnetic balance, the current in the respective windings 44 and 45 of relay 36 would tend to cancel each other; and the current in the respective windings 325 and 329 of relay 123 would tend to cancel each other.

In the composite signaling circuit ground terminal at the attended station shown in Figs. 2, 20 and 4, channel No. 4 includes in Fig. 20 lead 376 and winding 50 of relay 54, and in Fig. 4 lead 376, winding 332 of relay 115, winding 333 of relay 231, and the junction between resistances 334 and 335 which forms a potentiometer between battery and ground. A balancing circuit for the neutralizing circuit comprises in Fig. 4 the junction between the resistances 334 and 335, windings 336 of relay 231, winding 337 of relay 115, and lead 378, and in Fig. 20 lead 378, winding 51 of relay 54, the balancing network and the junction between the resistances 338 and 339 which form a potentiometer between battery and ground. The operation of the neutralizing circuit just traced is similar to that for the composite signaling circuit battery terminal just described. The leads 383 and 446 of the composite signaling circuit ground terminal at the unattended station correspond to leads 376 and 348 of the composite signaling circuit ground terminal at the attended station.

What is claimed is:

1. In an alarm system for an intelligence transmission system, an attended station, an unattended station geographically separated from said attended station, means at said unattended station subject to a fault, an indicator at said attended station, means for operating said indicator in response to the occurrence of a fault at said fault means to record the fault occurrence in said indicator, and means to restore said indicator and operating means to the normal condition and thereby cancel the record of the fault occurrence for differentiating between a transitory fault and a permanent fault, said differentiation being in a sense that a failure of said indicator to reoperate a second time to record a fault occurrence denotes that the initial record was due to the occurrence of a transitory fault in said fault means whereas a reoperation of said indicator a second time to record a fault occurrence denotes that a permanent fault occurred in said fault means.

2. A supervisory circuit for a signal transmission system comprising an attended station, an unattended station, apparatus in said unattended station adapted for remote control, means at said attended station for so controlling said apparatus as to establish a preselected condition in each thereof, means at said unattended station for producing a predetermined signal and an accompanying synchronizing signal in response to the establishment of said preselected condition in each of said apparatus, indicators in said attended station, means operated at will by an attendant in said attended station for activating said controlling means to establish said preselected condition in at least one of said apparatus thereby causing said signal means to transmit said predetermined signal and said accompanying synchronizing signal corresponding to said last-mentioned condition established in said one apparatus, said last-mentioned accompanying synchronizing signal serving to apply said last-mentioned predetermined signal to a particular indicator to show the preselected condition of said one apparatus, means for restoring said signal means and said indicators to a normal condition after each operation of said operated means, and means for rendering said controlling means inoperative when said signal means is operative and for rendering said signal means inoperative when said controlling means is operative.

3. In a communication system including an attended station, a plurality of unattended stations, a plurality of remotely controllable devices at each of said unattended stations, said devices being adapted to effect predetermined signals for representing certain operating conditions thereof, and a transmission line connecting said stations, a supervisory apparatus comprising means at each of said unattended stations for generating a cycle of pulse signals, means at each of said unattended stations for scanning said devices thereat in response to said pulse signals and causing said devices to apply said predetermined signals to said line, said generating means also causing the application of a cycle of other pulse signals to said line, means at said attended station for applying a certain signal to said line to select a particular unattended station and to cause said generating means at said last-mentioned station to run through one cycle of its pulse signals, means comprising a group of discrete indicators at said attended station responsive to said predetermined signals on said line to indicate the conditions of said devices at said selected unattended station, means for restoring said indicating means to a normal condition after said last-mentioned conditions have been indicated, and means at said attended station responsive to said other pulse signals on said line to direct said predetermined signals to particular indicators.

4. A combination according to claim 3 which includes at least one unattended station connected to said line intermediate said selected unattended station and said attended station, and means at said intermediate station for repeating said signals on said line, said repeating means comprising vibrating circuits for eliminating the signals received at said intermediate station and substituting new bias-free signals for the eliminated signals.

5. A combination according to claim 3 which includes means at each of said unattended stations for controlling the transmission on said line of predetermined and other signals originating in the remaining unattended stations of said system, said controlling means at said selected unattended station being activated by said certain signal on said line to preclude the transmission of predetermined and other signals originating in the remaining unattended stations of said system during the interval when said generating means at said selected unattended station is engaged in applying said predetermined and other signals to said line.

6. A combination according to claim 3 in which said plurality of unattended stations comprises at least two discrete groups of unattended stations extending in different geographical directions, and which includes further means at said attended station for permitting signaling transmission between said attended station and the group of unattended stations including said selected unattended station but holding up signaling transmission between said attended station and the other groups of unattended stations.

7. In an alarm system for an intelligence transmission system, in combination, an attended station, a plurality of unattended stations spaced from each other and from said attended station, a transmission line, means at each of said unattended stations subject to a fault, means for connecting each of said unattended stations to said line in response to the occurrence of a fault each thereof at a different time, said last-mentioned means being initially responsive to said fault occurrence for applying a preselected signal to said line for identifying both the fault unattended station and the type of fault, said connecting means at each unattended station intermediate said attended station and the fault station serving initially to connect such intermediate stations to said line in series with said attended station and said fault station and for causing such intermediate stations to repeat said preselected signal on said line, said last-mentioned means comprising vibrating circuits to connect such intermediate stations to said line and to reform at said last-mentioned stations said preselected signals received thereat and to transmit the reformed signals on said line and thereby compensate said preselected signals for any tendency to include distortion therein, and indicating means at said attended station responsive to said preselected signal received on said line thereat for indicating both the fault originating unattended station and the type of fault.

8. An alarm system according to claim 7 in which said indicating means includes means at said attended station for storing the fault signals received from said fault unattended stations regardless of the order of the unattended stations originating said fault occurrences whereby the fault occurrences at said fault unattended stations may be cleared in such order as circumstances warrant.

9. In an intelligence transmission system including an attended station, a plurality of unattended stations, and a signaling line connectable to said stations, an alarm and control circuit for supervising the operation of said unattended stations from said attended station, said circuit comprising means for adapting said line with three composite signaling channels and a fourth channel for neutralizing the effect of longitudinal voltages on signaling transmission in said composite channels, means at each unattended station responsive to the occurrence of a fault thereat for seizing said line and sending a preselected signal on a first composite signaling channel to said attended station, means at said attended station responsive to said preselected signal to send a further preselected signal back on said first channel to said fault station to cause said fault station to send a preselected fault signal on said first channel, means at said attended station operated by said preselected fault signal for indicating the type of said fault and for identifying the unattended station originating said preselected fault signal, means at said attended station for wiping out said fault indication on said indicating means to enable a differentiation between transitory and permanent fault occurrences in such sense that a permanent fault causes the reoperation of said fault indication on said indicating means at said attended station whereas a transitory fault fails to cause the reoperation of said fault indication on said indicating means at said attended station, a plurality of further indicating means at said attended station, a plurality of indication points at each unattended station, means at each unattended station for scanning each of said indication points thereat, and means at said attended station for applying a certain signal to a second composite signaling channel to select a designated unattended station and to operate said scanning means thereat whereby a series of predetermined signals is applied to a third composite signaling channel and thereby to a corresponding discrete further indicating means at said attended station for identifying the condition of each indication point scanned and whereby a plurality of synchronizing signals are applied to said second composite signal channel for ensuring that each predetermined signal is applied to a particular discrete further indicator at said attended station, said further indicating means at said attended station being controlled by said predetermined signals to indicate at said attended station the condition of each indication point scanned, means at each unattended station for precluding other unattended stations from effectively operating to send or receive signals when said fault or designated unattended station is engaged in signaling operations, and means at said attended station controlled by a signal from said fault or designated station to render said attended station inoperative to send out signals during signal transmission from said last-mentioned unattended station to said attended station, said fourth channel tending to prevent extraneous longitudinal voltages from impairing signaling transmission on said first, second and third channels.

10. In an intelligence transmission system comprising an attended station, a plurality of unattended stations, and a signaling transmission line connected to said attended station and connectable to said unattended stations, said line comprising at least two discrete signaling channels, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means in one of said channels for transmitting said selecting signals and said information signals to effect two-way signaling transmission in said one channel, means at said attended station responsive to said information signals on said line to provide indications thereof, means at said attended station and each of said unattended stations for synchronizing said indication signal means and said indication, and means in a second of said channels means, and means in a second of said channels for interconnecting said synchronizing means at said attended station and each of said unattended stations to effect one-way signaling transmission in said second channel.

11. In an intelligence transmission system comprising an attended station, a plurality of unattended stations, and a signaling transmission line connected to said attended station and connectable to said unattended stations, said line comprising at least three discrete channels, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, means at said attended station and each of said unattended stations for synchronizing said information signal means and said indication means, means in one of said channels for transmitting said selecting signals and said information signals to effect two-way signaling transmission in said one channel, means in a second of said channels for interconnecting said synchronizing means at said attended station and each of said unattended stations to effect one-way signaling transmission in said second channel, and means in a third of said channels for establishing in said third channel in response to extraneous currents therein a magnetic effect opposing the magnetic effect due to extraneous currents in said one and second channels and thereby neutralizing said extraneous currents tending to impair signaling transmission in said one and second channels.

12. In an intelligence transmission system comprising an attended station, a plurality of unattended stations, and a signaling transmission line connected to said attended station and connectable to said unattended stations, said line including means for providing on said line in response to certain extraneous currents thereon a magnetic effect opposite to and canceling the magnetic effect due to other extraneous currents tending to impair signaling transmission on said line and thereby neutralizing the impairing tendency of said other extraneous currents on signaling transmission on said line, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, and means at said attended station and each of said unattended stations for synchronizing said information signal means and said indication means.

13. In an intelligence transmission system comprising an attended station, a plurality of unattended stations, and a signaling transmission line connected to said attended station and connectable to said unattended stations, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, and means at said attended station and each of said unattended stations for synchronizing said information signal means and said indication means, said supervisory means including means at individual unattended stations for seizing said line and applying a signal thereto in response to the occurrence of a fault at individual unattended stations, means at said attended station operated by said last-mentioned signal for sending on said line a further signal to the fault unattended station, means at said last-mentioned unattended station responsive to said further signal for applying to said line a preselected fault signal to identify the unattended station originating said preselected fault signal and the character of the fault as a major or a minor type, means at said attended station responsive to said preselected fault signal for indicating the identity of the fault unattended station and the major or minor character of the fault, and means at said attended station for enabling a differentiation between permanent and transitory faults, said last-mentioned means comprising means for wiping out said fault indication whereby said fault at the fault unattended station is caused to repeat the application of said preselected fault signal to said line thereby to effect the reoperation of said fault indicating means at said attended station when the fault is permanent and whereby said fault at said fault unattended station fails to reapply said preselected fault signal to said line thereby failing to effect the reoperation of said fault indicating means when the fault is transitory.

14. In an intelligence transmission system comprising an attended station, a plurality of unattended stations, and a signaling transmission line connected to said attended station and connectable to said unattended stations, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, and means at said attended station and each of said unattended stations for synchronizing said information signal means and said indication means, said information signal means at each of said unattended stations comprising a plurality of pairs of contacts, one contact pair being associated with each information signal, certain contact pairs being closed to apply ground to said line for supplying information concerning certain operating conditions, other contacts pairs being open to constitute an open circuit on said line for supplying information concerning other operating conditions, said indication means at said attended station comprising a plurality of lamps each of which is connectable to a corresponding pair of contacts at each of said unattended stations, said lamps being controlled by said ground and open circuits for visually representing said certain and other operating conditions at each of said unattended stations, said synchronizing means ensuring the connection of each of said lamps to said corresponding pair of contacts at each of said unattended stations.

15. In an intelligence transmission system comprising an attended station, a plurality of unattended stations, and a signaling transmission line connected to said attended station and connectable to said unattended stations, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, and means at said attended station and each of said unattended stations for synchronizing said information signal means and said indication means, said information signal means at each of said selected unattended stations comprising a plurality of pairs of contacts, one contact pair being associated with each information signal, certain contact pairs being closed to apply ground to said line for supplying information concerning certain operating conditions, other contact pairs being open to constitute an open circuit on said line for supplying information concerning other operating conditions, said indication means comprising a plurality of lamps each of which is connectable to a corresponding contact pair at said selected unattended stations, said lamps being controlled by said ground and open circuits for visually representing said certain and other operating conditions at each of said selected unattended stations, and said supervisory means further including means at each of said selected unattended stations for synchronizing said information signal means and said indication means in such manner that each contact pair is connectable to a particular lamp.

16. In an intelligence transmission system comprising an attended station, a plurality of unattended stations, and a signaling transmission line connected to said attended station and connectable to said unattended stations, means for supervising the operation of said unattended stations from said attended station, said last-mentioned means including means at said attended station for applying to said line a signal to select an unattended station and to request information signals therefrom regarding operating conditions thereat, means at said selected unattended station controlled by said first-mentioned signal to supply the requested information signals to said line, means at said attended station responsive to said information signals on said line to provide indications thereof, and means at said attended station and each of said unattended stations for synchronizing said information signal means and said indication means, said supervising means including means at said attended station for precluding the transmission of signals therefrom when said information signals are being received thereat and when said synchronizing means at both said selected unattended station and said attended station are operative.

17. In an intelligence transmission system comprising an attended station, at least two unattended stations, and a signaling transmission line for connecting said unattended stations in series or independently to said attended station, said line including at least three signaling channels, means for supervising the operation of said unattended stations from said attended station, said last-mentioned means including means at said attended station for applying to said line a signal to select an unattended station and to request information signals therefrom regarding operation conditions thereat, means at said selected unattended station controlled by said first-mentioned signal to supply the requested information signals to said line, means at each unattended station for transmitting alarm signals to said attended station on a first channel of said line, means at each unattended station for enabling transmission of said information signals on second and third channels of said line from said unattended stations to said attended station, said alarm signal means being effectively disconnected from said first channel during the transmission of said information signals on said second and third channels, means at said attended station responsive to said information signals on said second and third channels to provide indications thereof, and means at said attended station and each of said unattended stations for synchronizing said information signal means and said indication means.

18. In an intelligence transmission system, an attended station, a plurality of unattended stations, a transmission line interconnecting said stations, a plurality of operating conditions at each of said unattended stations, each condition being representable by a predetermined signal, a plurality of indicators at said attended station, each indicator being connectable to a particular operating condition, means at said attended station for applying a signal to said line for preselecting one of said unattended stations, means at each of said unattended stations responsive to said preselected signal for generating pulses and transmitting certain of said last-mentioned pulses over said line to said attended station, means at each of said unattended stations responsive to others of said generated pulses for scanning said operating conditions thereat in sequence and causing said operating conditions to apply said predetermined signals to said line, and means at said attended station responsive to said certain pulses received from said line for scanning said indicators and applying said predetermined signals received from said line to particular indicators to register corresponding operating conditions.

19. In an intelligence transmission system, an attended station, a plurality of unattended stations, a transmission channel interconnecting said stations, means at each of said unattended stations responsive to the occurrence of a fault thereat for seizing said line and transmitting a certain signal to said attended station, means at said attended station responsive to said certain signal for automatically transmitting a preselected signal to said fault unattended station to indicate that said attended station is ready to receive further signals, means at each unattended station responsive to said preselected signal for transmitting a combination of pulses to identify the particular unattended station originating said last-mentioned pulses and the importance of said fault from a major or minor standpoint, and means including a relay chain at said attended station to count said combination of pulses for recording the identity of the said particular unattended station and said importance of said fault.

20. In an intelligence transmission system, an attended station, a plurality of unattended stations, a transmission line connecting said stations, a plurality of operating conditions at each of said unattended stations, each of said conditions being representable by a predetermined signal, a bank of indicators at said attended station, each indicator being connectable over said line to one of said operating conditions, means at said attended station for applying a signal to said line for preselecting one of said unattended stations, means at each of said unattended stations responsive to said preselected signal for generating scanning pulses and applying certain of said last-mentioned pulses to said line, counting relays at each of said unattended stations responsive to others of said generated pulses for scanning said conditions and applying to said line said predetermined signal for representing each of said scanned conditions, and counting relays at said attended station responsive to said certain pulses for scanning said indicators and applying said predetermined signals to particular indicators and thereby registering said operating conditions.

RICHARD B. HEARN.
HAROLD M. PRUDEN.

REFERENCES CITED

The following references are of record in the file of this patent:

UNITED STATES PATENTS

| Number | Name | Date |
|---|---|---|
| 1,689,294 | Potts | Oct. 30, 1928 |
| 1,699,759 | Shepherd | Jan. 22, 1929 |
| 1,814,524 | Nelson | July 14, 1931 |
| 1,816,496 | Ritter et al. | July 28, 1931 |
| 1,860,191 | Linstrow et al. | May 24, 1932 |
| 1,963,600 | Voss | June 19, 1934 |
| 2,047,631 | Hershey et al. | July 14, 1936 |
| 2,241,899 | Brown et al. | May 13, 1941 |
| 2,269,692 | Rosene | Jan. 13, 1942 |
| 2,424,571 | Lang | July 29, 1947 |
| 2,444,078 | Weaver | June 29, 1948 |